United States Patent [19]

Jones et al.

[11] 3,803,558

[45] Apr. 9, 1974

[54] PRINT SELECTION SYSTEM

[75] Inventors: Clifford M. Jones; Earle B. McDowell, both of Waynesboro, Va.

[73] Assignee: General Electric Company, Waynesboro, Va.

[22] Filed: Dec. 6, 1972

[21] Appl. No.: 312,722

Related U.S. Application Data

[63] Continuation of Ser. No. 91,160, Nov. 19, 1970, abandoned, which is a continuation of Ser. No. 734,501, June 4, 1968, abandoned.

[52] U.S. Cl. .......... 340/172.5, 101/93 C

[51] Int. Cl. .......... G06k 1/00

[58] Field of Search .......... 340/172 T; 101/93 C

[56] References Cited

UNITED STATES PATENTS

| | | | |
|---|---|---|---|
| 2,850,566 | 9/1958 | Nelson | 340/172.5 |
| 3,377,622 | 3/1968 | Burch, Jr. et al. | 340/172.5 |
| 3,408,633 | 10/1968 | Shimabukuro | 340/172.5 |
| 3,582,897 | 6/1971 | Marsh, Jr. | 340/172.5 |

*Primary Examiner*—Paul J. Henon
*Assistant Examiner*—Paul R. Woods

[57] ABSTRACT

A print selection system for a printer detects printable characters by comparison of numbers representing print characters at designated print positions with numbers representing input characters desired to be printed at these designated print positions. Serial storage of the numbers compared, bit-by-bit serial computation and partial line storage capacity combine to afford minimum hardware high-speed print selection.

70 Claims, 14 Drawing Figures

INVENTOR.
CLIFFORD M. JONES
EARLE B. MC DOWELL
BY Stanley C Corwin
THEIR ATTORNEY INVENTOR.
CLIFFORD M. JONES
EARLE B. McDOWELL
BY Stanley C Corwin
THEIR ATTORNEY INVENTOR.
CLIFFORD M. JONES
EARLE B. McDOWELL
BY
[signature]
THEIR ATTORNEY INVENTOR.
CLIFFORD M. JONES
EARLE B. McDOWELL
BY Stanley C Corwin
THEIR ATTORNEY INVENTOR.
CLIFFORD M. JONES
EARLE B. McDOWELL
BY Stanley C Corwin
THEIR ATTORNEY INVENTOR.
CLIFFORD M. JONES
EARLE B. Mc DOWELL
BY Stanley C Corwin
THEIR ATTORNEY INVENTOR.
CLIFFORD M. JONES
EARLE B. McDOWELL
BY Stanley C. Corwin
THEIR ATTORNEY INVENTOR.
CLIFFORD M. JONES
EARLE B. McDOWELL
BY Stanley C Corwin
THEIR ATTORNEY INVENTOR.
CLIFFORD M. JONES
EARLE B. McDOWELL
BY Stanley C. Corwin
THEIR ATTORNEY INVENTOR.
CLIFFORD M. JONES
EARLE B. McDOWELL
BY Stanley C Corwin
THEIR ATTORNEY

PRINT SELECTION SYSTEM

The present invention is a continuation of our co-pending application Ser. No. 91,160, filed Nov. 19, 1970, which in turn is a continuation of application Ser. No. 734,501, filed June 4, 1968, both assigned to the same assignee as the present continuation, and both now abandoned.

1. Field of the Invention

The present invention relates to print selection systems for high-speed printers and in particular relates to print selection systems for the control of partial line printers.

2. History of the Art

There are a wide variety of printers shown in the prior art. There are slow printers such as the typewriter and high-speed printers, such as the line printer. A typewriter is slow basically because it has only the capacity for printing one character at a time. The key that is actuated is the input intelligence which is remembered only until it is printed. Only one character can be printed at one time.

Line printers have an ability to store in a memory the input intelligence for all the characters that will make up a complete line or print. Input intelligence for each character desired to be printed is placed in storage at the appropriate print position in the memory and is used to select from a complete alphabet of print characters for each print position the one desired for that position. As many as all the characters on a line can be printed at one time. Reference may be made to Pats. Nos. 3,314,360 dated 4/18/67, 3,366,045 dated 1/30/68, 2,874,634 dated 2/24/59, 2,936,704 dated 5/17/60 and 3,099,206 dated 7/30/63, which are representative of some of the art prior to applicants'invention.

Another kind of printer which borrows some of the features of each of the above two mentioned types is the partial line printer. More than one and generally less than all the print positions on a line can be printed simultaneously by such printers. The advantages of a partial line printer are its relatively low cost, simple circuitry and relatively high speed. Heretofore, these advantages have not been completely recognized in prior art systems with which the applicants are familiar. High speed and low cost are two advantages which are in a sense antithetical.

Several features of the print selection system combine to achieve the high speed-low cost balance. In an effort to obtain better balance between relatively high speed and relatively low cost for particular printer applications concerned, the concepts of simultaneously printing out partial line of print and employing serial computation are involved. Serial computation enables the use of a small memory having a capacity sufficient to buffer the difference between worst case single character printout speed and the rate of receipt of input information. Serial computation also eliminates the need for separate evaluation devices for each print position. The computations, in effect, take place along the print line at each print position in succession. Given a printer in which print characters are arranged in a predetermined order and adapted to move during printing so that print character intelligence moves from column to column parallel to the print line, it is necessary to compare the number of the print character at a given print position with an indication number of the input character desired to be printed at that position to detect whether said print character is printable or is not printable at that position. The term "numbers" as used in the specification is intended to include within its meaning signals representing the numbers, i.e., numerical representations. In the preferred embodiment of the invention print character selection is accomplished by a computation based on three pieces of information: the number representing the input character, the number indicating the column in which this input character is to be printed, and the number representing the print character approaching the first column, a reference position. By adding the number of the print character approaching the reference position to the number of the column at which it is desired to print an input character, a number is obtained by this summation which is the number of the print character at that column. This relationship between print character numbers and column numbers is realized because each print character number is an integral increment, e.g., one, greater than the number of the preceding character in the predetermined order of print characters, the integral increment being the same as the difference between the numbers for adjacent columns. The sum is then compared with the number for the input character desired to be printed at this column. If there is coincidence, a printable character is realized, i.e., a print character is identified as one in position or coming into position to be used to effect printing at a desired column location.

The three numbers representing an input character, the column for printing the input character and the print character in the reference position are stored by the print selection system and operated upon in a serial manner. Thus, circulation of the stored information concurrently with the movement of a plurality of print characters arranged in a predetermined order along a line of type offers advantages which will be described shortly. Another feature of the invention is to utilize each coincidence indication of a printable character to erase that input character from memory which corresponds to the printable character selected so that immediately there is capacity available for storing another incoming character number. A further feature of the invention is to store printable character indications so that all print characters which have been recognized as being printable for any one position of the print characters can be printed simultaneously.

Other objects and advantages and a better understanding of the print selection system of the present invention will be realized from the detailed description of an exemplary embodiment and the specific examples which follow. This detailed description is aided by drawings in which.

Figure 1:
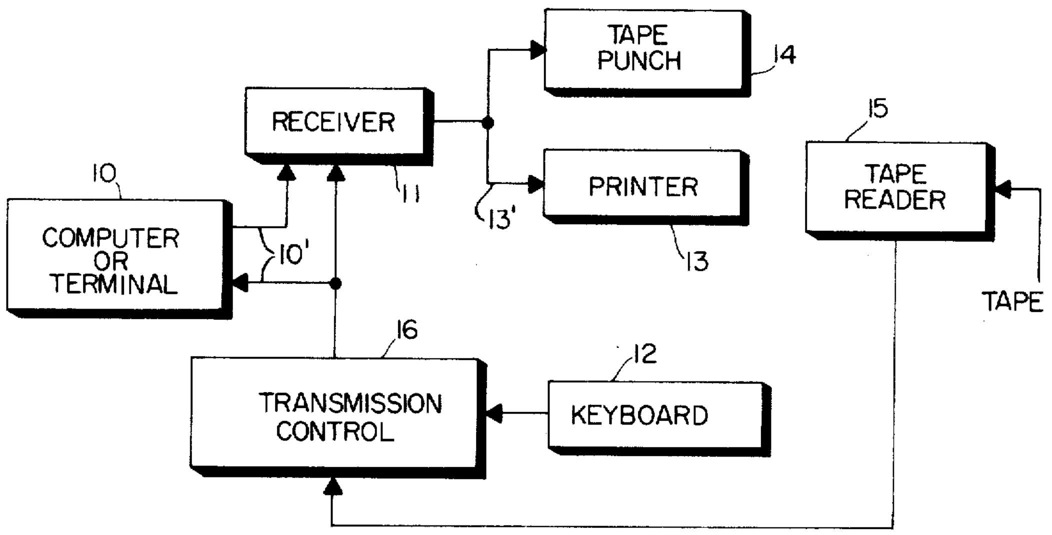
FIG. 1 is a block diagram of a communication terminal including a printer utilizing the print selection system of the present invention.

Referring now to the drawings, wherein like characters represent like parts throughout, there is shown in FIG. 1 a block diagram of a communication terminal. A communication terminal is a machine for communicating via telephone line with another remotely located machine (such as a computer) or another person such as by means of a second communication terminal. In FIG. 1 it can be seen that a typical communication terminal is made up of a keyboard 12 which in appearance is much line the keyboard of a typewriter. The keyboard is a means for creating input information which is relayed by a transmission control 16 either to the receiver 11 or to the external source which is the remotely located station and may consist of a computer or another terminal as indicated in block 10. The transmission control can also be set to relay the information from the keyboard to both the external source and the receiver 11 simultaneously. It is seen that the receiver 11 is responsive to information from the external source 10 and from the keyboard 12. The information received by the receiver 11 is applied to a printer 13 and also to a tape punch 14. The tape punch 14 serves merely to record the input information in a readily reproducible form which is also convenient for storage. A tape reader 15 is also shown as another means of supplying information via the transmission control 16 to either the external source 10 or the receiver 11.

Figure 2:
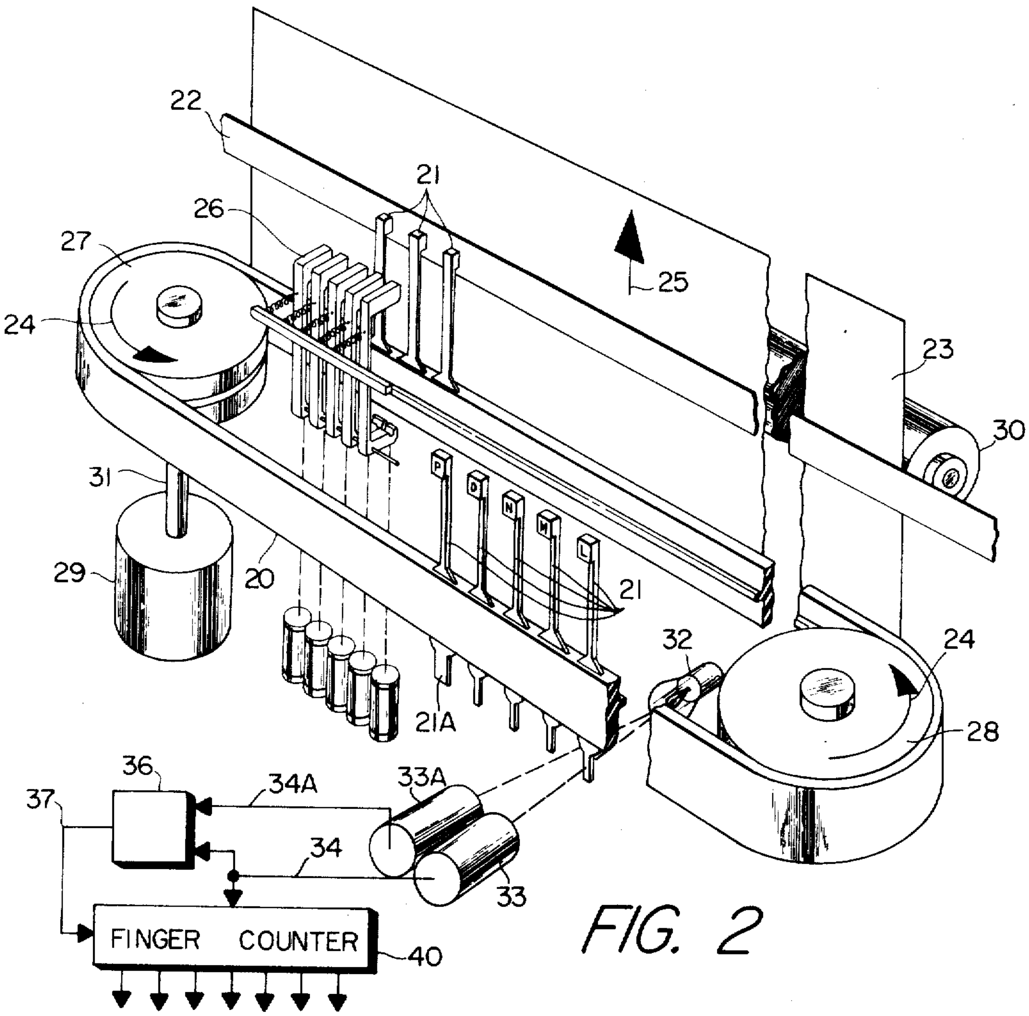
FIGS. 2 and 3 are diagrammatic illustrations of portions of a preferred printer mechanism.
Figure 3:
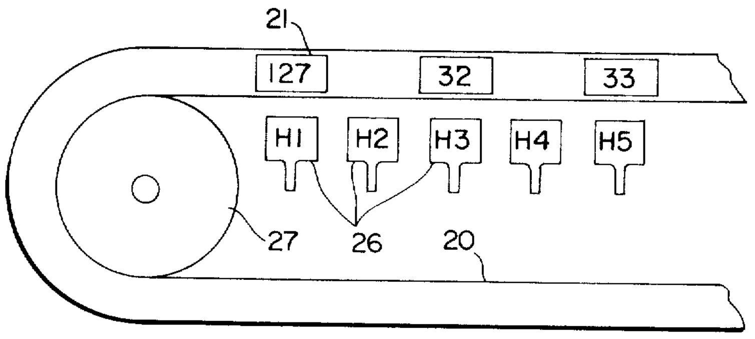

The invention is a control system for controlling the printing of the printer in such a communication terminal as shown in FIG. 1. Referring now to FIGS. 2 and 3, there are shown portions of the printing mechanism preferred for the printer in the system of FIG. 1. There is shown a belt 20 supported and driven by pulleys 27 and 28. The direction of the motion of the belt is indicated by arrows 24, in a counterclockwise direction. Drive motor 29, connected by shaft 31, powers pulley 27 to provide the belt with a substantially constant speed drive. Much like a picket fence the belt 20 supports a plurality of fingers 21, each finger having on the uppermost face thereof a print or type character. The motion of the belt is such that the plurality of different print characters arranged in a predetermined order move parallel to the proposed print line in front of a plurality of hammers 26. A recording medium such as a piece of paper 23 is shown being supported against a platen or roller 30. Ink ribbon 22 passes between the paper and the print character bearing fingers. The hammers when actuated strike the finger into the ribbon and thus into the paper. Arrow 25 indicates the direction of movement of the paper. The paper moves perpendicular to the print line and the print characters move from column to column parallel to the print line. Since the fingers 21 are embedded in the belt, which preferably is of a resilient plastic material such as polyurethane polymer, they are thus fixed in a predetermined order. The belt 20 may carry several fonts of characters or only one font of characters depending upon the size of each font.

FIG. 2 also shows photosensors 33 and 33*a* and a light source 32 placed on either side of the belt at a position to detect the passage of the fingers. A counter 40, which is arranged to count within the range of the code of predetermined number representing the print characters is actuated by pulses from photosensor 33 indicating the passage of fingers. FIG. 3 shows that one standard code for printable characters may range from the number 32 to the number 127. Thus, counter 40 would begin its count at 32 and count to 127.

Also shown in FIG. 2 is a reset device 36 for applying a signal over lead 37 to counter 40 for resetting this counter at each indication of the beginning of a font of print characters. As explained in greater detail with regard to FIG. 10, the counter 40 is reset by reset means 36 when the wide finger 21A is sensed by photosensors 33, 33*a*. Wide finger 21A is positioned in the font at a point to be detected by the photosensors when the first print character in the font is approaching the first column.

The preferred arrangement between the hammers 26 and the fingers 21 for accommodating high-speed printing is shown in FIG. 3. It is noted that there is one hammer for each column but that the fingers are arranged to align with every second hammer. Thus, printing alternates between odd columns and even columns. The arrangement between print characters and hammers shown in FIG. 3 is found to be most suitable with the print actuation system selected. This is an impact type system where hammers are ballistically driven on a collision course with print characters moving at a right angle thereto toward alignment with the hammer positions.

To summarize briefly, the printing mechanism for which the print selection system of the present invention was designed is one in which movement of the prearranged print characters causes print intelligence to move from column to column parallel to the print line. The import of this feature is more succinctly illustrated in FIG. 4 in which there is shown a drum 35 for the belt 20 of FIGS. 2 and 3. Although the drum revolves at right angles to the print line, it is noted that print intelligence effectively moves parallel to the print line. The drum is suitable for being placed in the position of the platen 30 such that with the ribbon placed between the paper and drum, the hammer would strike the paper into the ribbon and print characters on the drum. The drum contains a set or rows of type characters, for each print column position, whereas the belt arrangement as shown can operate with one common set of type characters for all of the common positions. As shown, the bottom row of drum type characters is in line with the print line in the figure containing the letter A in the left-most position with a space sufficient between the characters such that the characters alternately align with every second print position along the print line. In the next row up, B is placed in the second column or print position and is the first character in the row of characters. In the third and topmost row of characters shown, C has now moved into the first print position and the sequence will follow with C moving to the second and then the first in the next two rows as the drum rotates in a clockwise manner as indicated by the arrow. Thus, it is seen that as the drum rotates in the clockwise direction, print intelligence effectively moves parallel to the print line, the character B, for example, proceeding from the third print position to the second and then to the first with the movement of the print characters vertically or in line with the columns.

Figures 4, 5:
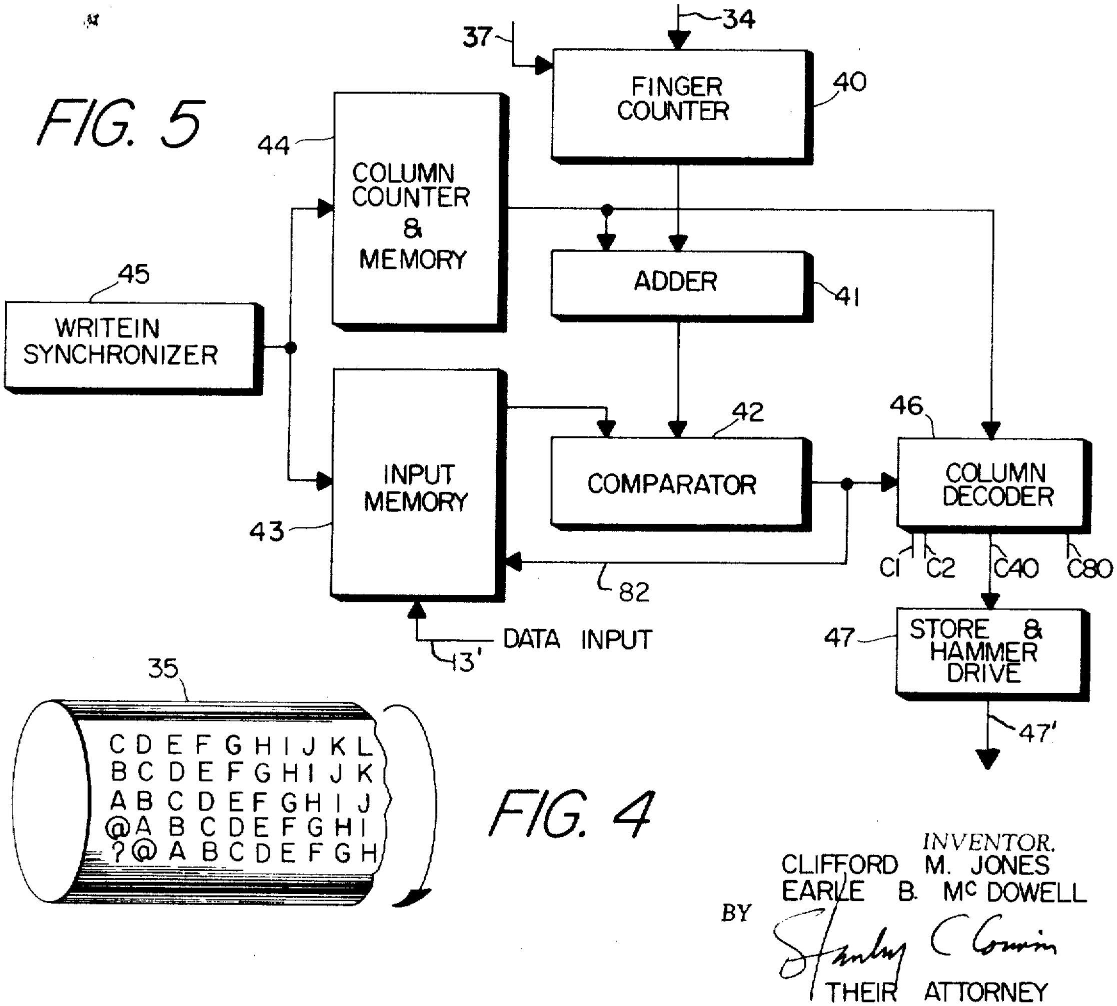
FIG. 4 is an illustration of an alternative embodiment of a print carrier for a printer.
FIG. 5 is a block diagram of the print selection system of the present invention.

With this prelude to the characteristics of the printing mechanism, FIG. 5 is now referred to to illustrate the basic precepts of the print selection system of the present invention. Input character information in the form of an input character number from a keyboard, such as keyboard 12 in FIG. 1, or from tape reader 15 or an external source 10 is applied to an input memory 43 by such means as the receiver 11 of the system shown in FIG. 1. Input memory 43 stores the numerical representation of each of the input characters comprising the input information. The writein of input characters into memory 43 is controlled by a writein synchronizer 45. Synchronizer 45 is responsive to the presence of an input character at the input to memory 43 and the availability of a storage capacity at the input position of this memory. When an input character is present and memory 43 is free to receive it, synchronizer 45 alerts or strobes the input memory to receive the character and also a second memory 44 which receives a number from its counter which corresponds to the column in which the input character simultaneously received is to be printed.

Another source of information to the system is from the photosensor 33 which provides the stimulus to finger reference counter 40 to register a number corresponding to the print character at a reference position along the print line, e.g., the character adjacent column 1. Thus, memory 43 receives and stores the input character information which is desired to be printed, memory 44 stores information indicating where the input information is to be printed, and register 40 stores information indicating where the print characters are that must be actuated to print out the input character information.

To obtain printout, each number stored in the column indicating memory 44 is added in an adder 41 to the number indicating the reference print character seriatim to obtain a series of sums, each sum being a number representing the print character at the print position represented by the value of the column indicating number from memory 44. To illustrate the significance of this calculation by example, let it be assumed that the reference print position is adjacent column 1. Thus, as will be described in greater deatil below, finger counter 40 contains a number, such as 32, which is the value of the character about to align with column 1. The numbers stored in memory 44, which indicate the column in which the input characters are to printed, may begin with the number 0 for the character to be printed in the first column, and for an eight character capacity, the numbers stored for the first eight input characters will extend from 0 through 7. Thus the value of the sum, 32 + 0, will be 32. Thus the value of the print character which can be printed in column 1 is 32. Since the number for each print character is greater than the number of the succeding print character by an integral increment, such as 1 in a preferred embodiment, and since the same integral increment separates the numbers accorded to adjacent columns, the number 1 will indicate the next column and it is added to the reference number 32 to produce the number 33 which is the number representing the character which can next be printed in column 2. It can be observed from the above example that the column indicating number "zero" indicates the first column and the number "one" indicates the second column. This is common practice where the system as here relies on binary numbers for its computation.

To repeat, the series of sums produced by adder 41 are numbers representing the print characters which can next be printed at the columns indicated by the column number forming a part of each sum. These print character numbers (the same) are compared by comparator 42 with the input character numbers stored in the input memory 43. It is to be noted that the comparison is on a bit-by-bit basis and is in synchronism with the circulation of memories 43 and 44 such that the sum which was produced by the column position number for the first input character is compared with the first input character number. If the print character approaching the first column has a number which compares with the input character number to be printed in the first column then there is a coincidence of numbers and an output is obtained from comparator 42.

The output of comparator 42 is applied to a columm decoder 46 and also back to the input memory 43. The feedback path to input memory 43 enables the input character which resulted in the finding of a printable character to be erased. This enables memory 43 to receive another input character in the space left.

The column decoder 46 receives the coincidence indicating signal from comparator 42. Column decoder 46 also receives seriatim the columns indicating numbers from memory 44 as they are applied to adder 41. Thus, as each computation is being made in the adder and comparator 42, the channel of the column decoder 46 corresponding to the column position number applied to the adder is energized. Thus, for example, when the column 1 indicating number, "zero", is being applied to the adder, the column 1 output channel C1 of column decoder 46 is energized. If there is a coincidence detected by the comparator 42, then the print actuation means for channel 1 is energized. In FIG. 5 the print actuation means is shown as a block 47 for the column 40 position C40. There is a print actuation means for each of the output channels of column decoder 46, each one being connected to the hammer for the corresponding column. Block 47 represents a memory or store unit and a hammer drive. The memory is provided for each of the columns such that all coincidence indications obtained for one examination of the contents of the input memory 43 will be stored so that for the one position of the print characters all hammers will be simultaneously actuated for all the printable characters located. This simultaneous printout results in random or nonsequential printout within the storage capacity of the memories 43 and 44.

Looking again at FIG. 5, the system that is there shown can be better understood by a consideration of the algorithm that is explanatory of the operation of this system. If N represents the input character number, C represents the column indicating number, i.e., number indicating the column in which the corresponding input character is desired to be printed; and if F represents the number indicating font position, i.e., the number of the print character in the font at a reference column; then the computation that is performed by the print selection system shown in FIG. 5 can be expressed by the algorithm $$F + C \overset{?}{=} N \qquad (1).$$

This algorithm of the system of FIG. 5 indicates that the number representing font position is summed with the number representing the column in which the input character is to be printed and compared with the input character numbers to detect equality.

Given the equation of the algorithm for the system of the present invention, it is possible to examine the transpositions of the equation to recognize other equivalent computations which may be performed for a print mechanism such as shown in FIGS. 2, 3 and 4 which are the equivalent of algorithm 1. A first transposition of algorithm 1 produces $$N - C \overset{?}{=} F \qquad (2).$$

The difference between algorithm 2 and algorithm 1 can be best illustrated by an example. Suppose that the input character number is 42 and it is desired to print this character in the fifth column. Therefore, C is 5. According to the first algorithm, if the font begins with print character 32, the sum of 32 and 5 being 37 would not equal 42 and the number N would continue to be stored along with its paired number 5 in storage. The belt or drum would move until 33 is the number identifying the print character which can next be printed in the first column. Another computation is then made. At this time $F + C = 38$ which is not equal to 42. Only when the print character having the number 37 is adjacent the reference print position column one is the print character having the number 42 adjacent the fifth column. At this time equality of numbers would be indicated by coincidence in comparator 42.

Now examining the second algorithm, it is seen that a number can be immediately obtained upon the receipt of the input character number N and its print position indicating number C which is the difference between these two numbers. Thus 42 − 5 = 37. Thus, you would store the number N − C along with C and compare the N − C number with each change in font position such that when the reference print character is 37, i.e., the character represented by the number 37 is adjacent the first column, there would be an eqaulity of 37 = 37 and the character in the fifth column which would be 42 is printed. The computation of the second algorithm, N − C, is obtained immediately as the numbers N and C are received. The difference N − C is then stored along with the column indicating number C. For each algorithm the column indicating number C must be stored to provide printout in the correct column position when the algorithm has been satisfied.

A third transposition of the first algorithm is $$N - F = C \qquad (3).$$

Here the number representing the print character which is adjacent the first column is subtracted from the input character which is desired to be printed. When this value is equal to the number of the column in which the input character is desired to be printed there is equality and printout can be achieved. Once again, if the number of the input character N is 42 and C is 5 then it is recognized that when the character represented by the number 37 is in the reference print position that the equation is satisfied and the character approaching the fifth column will be printed.

A fourth algorithm for a print selection system equivalent to the one described herein is $$N - C - F_0 = K \qquad (4).$$

where $F_0$ is the number representing the font position at the time $N$ and $C$ are received, i.e., the number of the print character approaching column 1 and $K$ is the number resulting from the computation $N - C - F_0$. Thus, for example, if the character indicated by the number 32 is adjacent the first column at the time N and C are received again where N = 42 and C = 5, then 42 − 5 − 32 = 5. Thus, K = 5 is the number that is placed in storage along with the number C and with each change in font position 1 is subtracted from K. When K = 0 printout of the character approaching the fifth column is initiated. While the fourth equation is a hybrid of the first three algorithms it is seen that this type of computation is merely a utilization of all of the numbers available at the first instant and then recognition of the condition for printout.

There are advantages and disadvantages assocaited with operation according to the above-described four algorithms. For example, the computation N − C and N − C − $F_0$ can be made upon receipt of the numbers. While this immediate computation appears to be an advantage, it is in fact a disadvantage, first because dealy must be provided to make the computation, and secondly because once the result of the computation is stored action is committed. As soon as the font is in the proper position printout is necessary. This forecloses delayed printout, such as is possible with operation according to the chosen algorithm $F + C \doteq N$ when the original numbers N and C are stored and computation resulting in printout can be delayed if desired. One advantage of the fourth algorithm, when the number K is stored, is the ease of zero detection over numerical comparison to recongize a printable character.

In the detailed examination of the print position system which follows only the system which satisfies the first algorithm is examined. It should be clear however from the foregoing that the equivalent algorithms 2, 3 and 4 admit of similar computation systems and are thought to be the full equivalent of the system described. Thus, the operations that are common for all of the algorithms is first, the storage of a pair of numbers. The first number contains input character intelligence, i.e., N itself for algorithms 1 and 3, the number N − C for algorithm 2 and the number K for algorithm 4. The second number is the printout column number C for each input character. The second common operation is the examination of each first nnmber at every change of print character position to detect a printable character.

Figure 6:
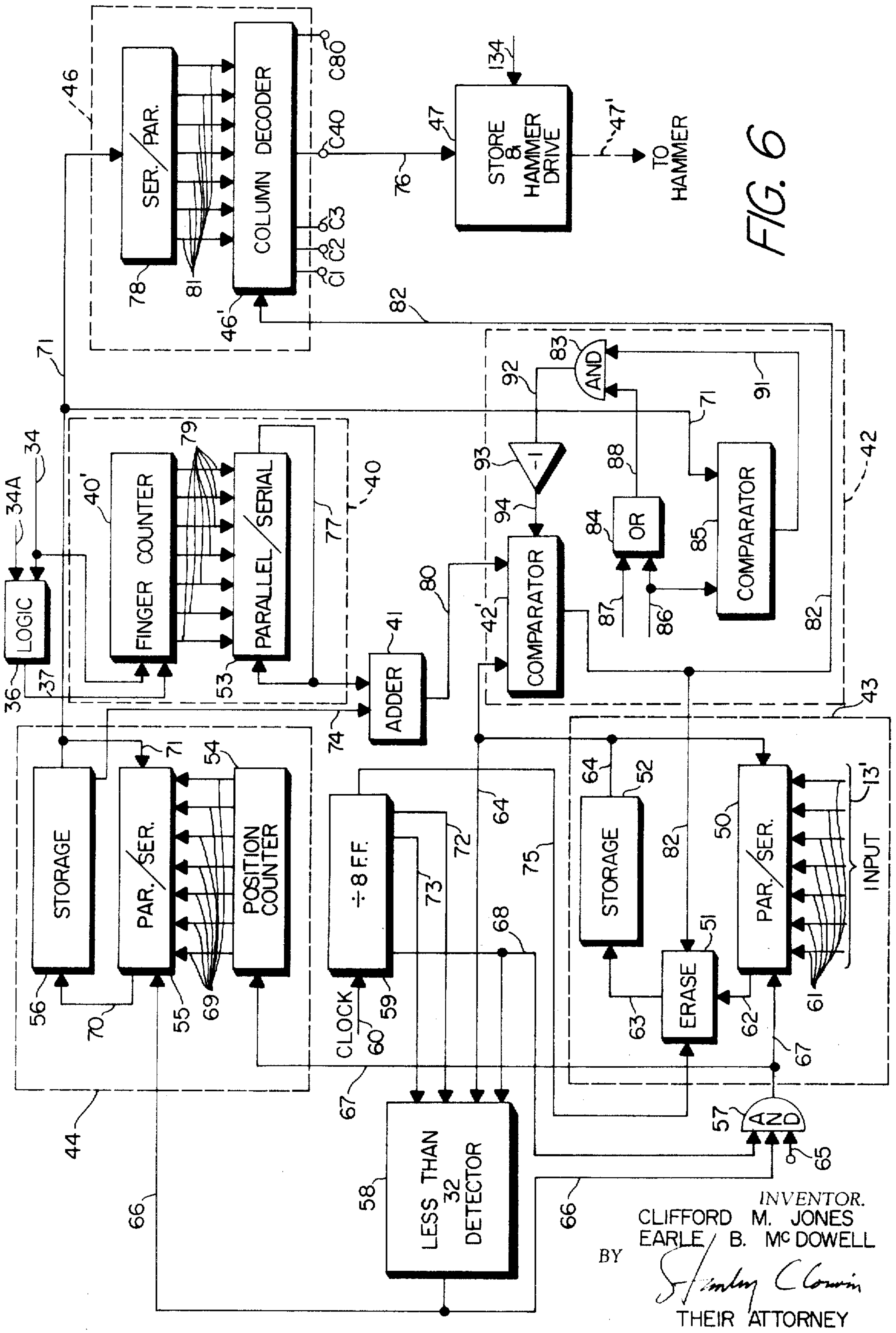
FIG. 6 is a detailed block diagram of the print selection system of the present invention.

In FIG. 6 there is shown a detailed block diagram of the print selection system more broadly shown in FIG. 5. The input memory 43 is shown to be made up of an input register 50 and a storage unit 52 with an erase gate 51 coupled between the memory units. It is noted that the input storage unit 50, the gate 51, and the storage unit 52 are all connected in series such that the information stored can continuously be circulated. The seven input leads 61 coupled to input data line 13' and the single output lead 62 from the input register 50 indicate that this unit is a parallel to serial converter and may comprise a shift register. Since the print selection system is designed to accommodate characters whose numerical representations are part of a standard code of numbers in the range of 32 through 127, there are seven input lines to the parallel to serial shift register 50. Thus, each character is a seven bit character and is written in in parallel to memory 43. The storage unit 52 receives input characters from the input unit 50 on a serial basis and has the capacity for storing 7 characters. Thus, the memory 43 is an 8 character storage unit, that is, 7 characters are stored in the storage unit 52 while one is stored in the input unit 50. The 8 character capacity is the buffer necessary between worst case single character printout speed and input character receipt rate. The column indicating number that is entered into memory 44 with the receipt of each input character number by input memory 43 is generated in a position counter 54. Counter 54 contains the number corresponding to the column in which the input character being received is to be printed. This number is written in to the memory input unit 55 as each character is received by memory 43 input unit 52. The capacity of the position counter is determined by the column capacity of the printer. The seven output lines 69 from the position counter to the memory input unit 55 indicate that the printer could have 127 columns. In the example chosen, however, the printer has but 80 columns and the counter 54 will count from 1 to 80 for each full line of print.

Like input memory 43, memory 44 contains an input parallel to serial shift register which is a single character storage unit serially coupled over line 70 to a 7 character storage unit 56. Each of the units 52 and 56 can be identical and might comprise shift registers.

All the numbers in storage and utilized for computation purposes in the system described are binary numbers. However, it is to be understood that this type of number system is purely a matter of choice and other number systems are equally applicable to the present invention.

The writein synchronizer 45 shown in FIG. 5 is again shown in FIG. 6 as the divide by 8 flip-flop 59, the less than 32 detector 58 and AND gate 57. The divide by 8 flip-flop has as its input a clock 60. This clock is applied to each of the memory units and to each of the computation units in the system, although it is shown only being applied to the divide by 8 flip-flop 59 for the purpose of simplifying the drawing. The divide by 8 flip-flop 59 provides three outputs which are utilized for synchronized writein of characters to memories 43 and 44. The first output shown at lead 68 is a bit one time. This is the signal that indicates the beginning of the 8 bits available for each word, thus indicating the time at which a character must be written in to the memory so that it can be recognized each time it is circulated. The bit 1 time signal is applied as one input to AND gate 57.

Eight bits are available in the memories of the print selection system for storing each 7 bit character. The additional bit per character is provided for character control such as print inhibit which may be needed for example at the end of a line of print during line feed.

Bit 6 time and bit 7 time are the second and third outputs from the divide by 8 flip-flop used for synchronized writein. Leads 72 and 73 apply the bit 6 time and bit 7 time signals to the less than 32 detector. The output of storage unit 52 is also applied on lead 64 to the less than 32 detector 58. Since lead 64 is also the input lead to the parallel to shift register 50, the information that is being circulated back into this input unit is simultaneously examined by the less than 32 detector at bit 6 and bit 7 times to determine if the character that is being put into the input unit is in fact a previously stored character. The code of numbers representing printable characters begins with 32. Thus, a 1 in either the bit 6 or bit 7 position indicates the presence of a printable character in the input unit and therefore no input character can be written in from the external line. Thus, the output of the less than 32 detector shows the presence of a space at the input unit and this condition necessary for writein is applied as a second input to AND gate 57, the bit 1 time signal from the divide by 8 flip-flop being the first signal to this AND gate.

The third input to AND gate 57 is on lead 65 which is coupled to the input line. Line 65 provides a binary 1 input to gate 57 when an input character is present to be written in to memory unit 43. Thus at bit 1 time when there is a character space in the input unit of memory 43 and there is a character available to be written in, the input unit 50 is strobed for writein.

It is noted that the output lead 67 from AND gate 57 is also connected to position counter 54. Thus, after a character is written in to memory 43 the position counter is stepped up one count. In addition, the less than 32 detection signal received by AND gate 57 on line 66, is applied to parallel to serial unit 55 so that at this time the count previously stored in counter 54 is written in to memory unit 44. Thus, the less than 32 detector, the divide by 8 flip-flop and AND gate 57 provide simultaneous writein to memories 43 and 44.

It is noted that the less than 32 detector connection to memory 44 input unit 55 occasions a writein to memory unit 44 whenever there is a space at the input unit to memory unit 43 even though a new character is not written in to memory 43. This is to provide an updating of the column count memory for the purpose of indicating the column to be next printed in, information useful for print position indication. This function forms the subject matter of another application and is only mentioned here to clarify the purpose of the less than 32 detector connection to memory input unit 55. Thus, for the purpose of the present invention the output of AND gate 57 could be applied to the parallel to serial shift register 55 and there need be no connection between the less than 32 detector 58 and the parallel to serial shift register 55.

Figure 7:
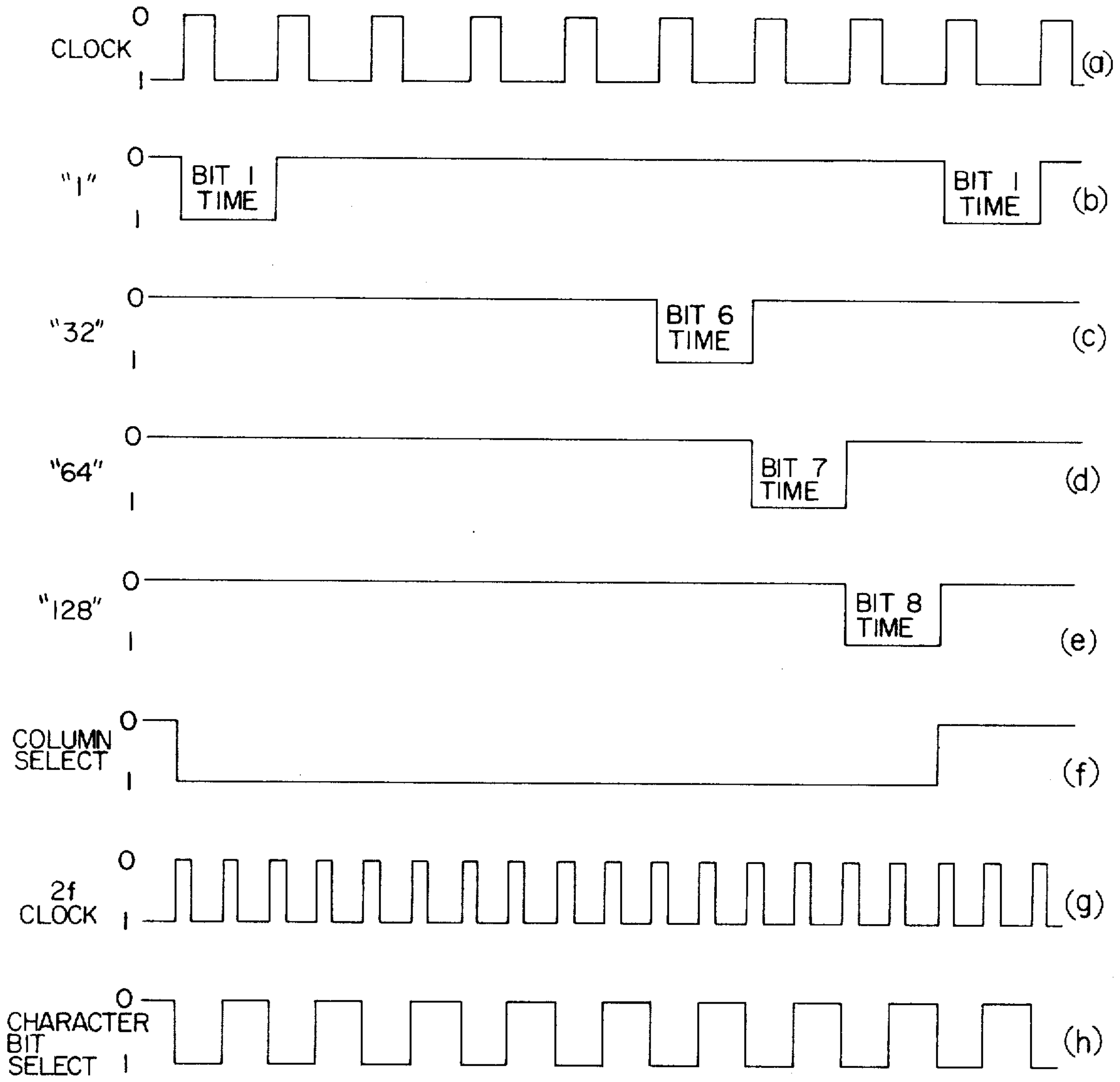
FIG. 7 is a chart illustrating timing signals for the print selection system shown in FIG. 6.

Referring momentarily to FIG. 7, there is shown the relationship between the system clock signal 60, the bit 1 time signal and the bit 6, bit 7 and bit 8 time signals derived by the divide by 8 flip-flop 59. Much the same as the token showing of the clock 60, the outputs of the divide by 8 flip-flop are applied to the various computation circuits where needed. For example, the bit 1 time signal is applied to adder 41 and comparator 42 to insure that the bit by bit computation starts off at the first bit of each number.

The third information input to the print selection system as shown in FIGS. 6 and 2 is on lead 34 from the photosensor 33. Upon receipt of each pulse from the photosensor 33 the finger counter 40 increases its count by an integral integer, such as 1, starting from the count 32 and continuing up through the count 127. Finger counter 40, like each of the storage and computation units in the print selection system, is synchronously controlled by the clock 60. Clock 60 is applied to the finger counter such that each count is registered on the next clock pulse after the receipt of a pulse from line 34. The count of finger counter 40 is applied over lines 70 to the register 53, a parallel to serial shift register like memory input units 50 and 55, which with its recirculation ability due to output to input interconnection 77 forms the third memory unit in the system. Clock 60 strobes the circulation of memory unit 53 in synchronism with the movement in memories 43 and 44 and the computation circuits 41 and 42 to which the contents of memory 53 is applied.

Figure 10:
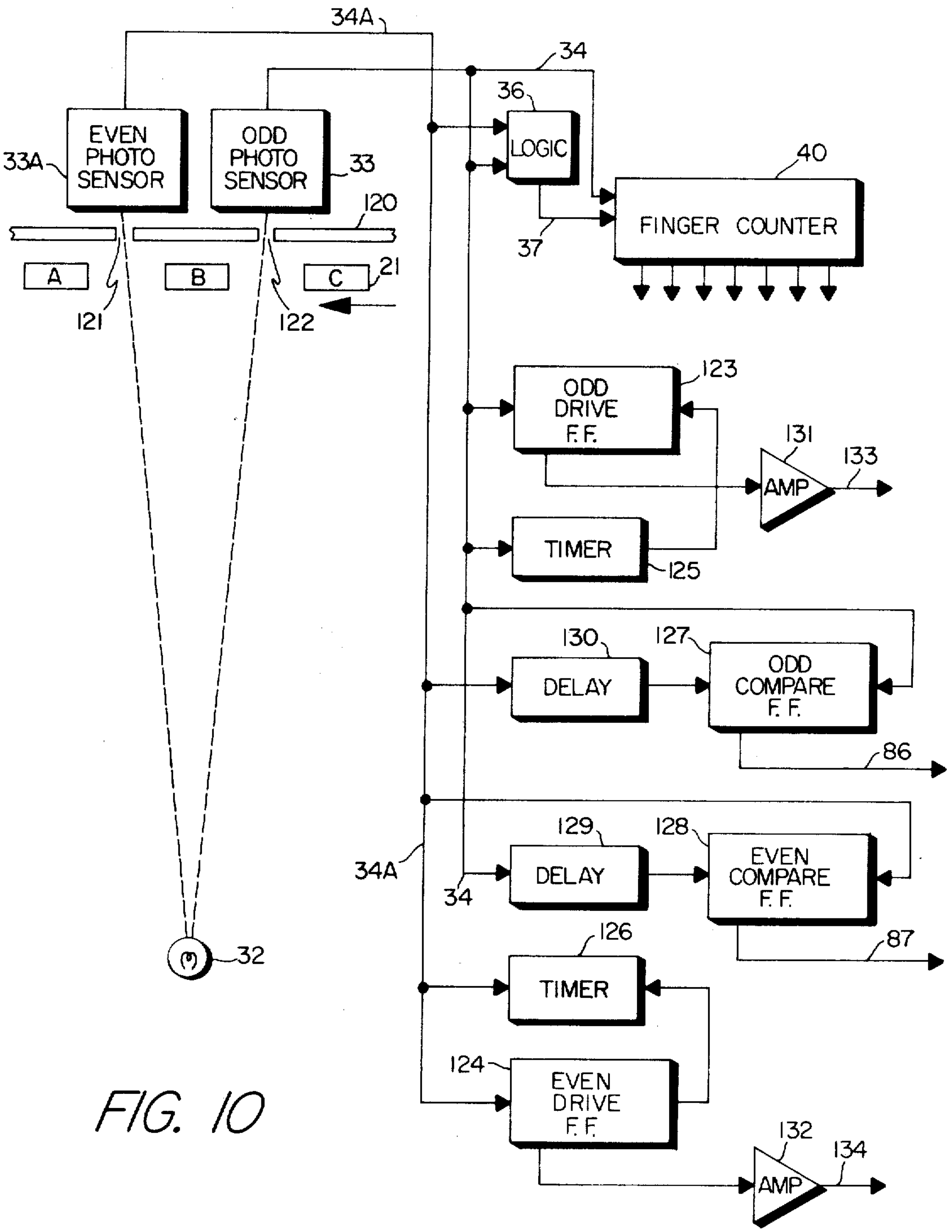
FIG. 10 is a sektch and block diagram of a system for obtaining timing signals for the comparison operation and print actuation for the print selection system shown in FIG. 6.

As is shown in more detail in FIG. 10, the outputs from photosensor 33 and photosensor 33*a* are applied to a logic circuit 36 via lines 34 and 34*a*. Logic circuit 36 resets finger counter 40 when the first character of a font of print characters is in the approach position to column 1.

It is noted that the count registered in counter 40 is written in to the parallel to serial shift register 53 shown in FIG. 6 in a writeover operation. Unlike the writein to memory 43, only when there is a space, requiring an erase operation, the writein to register 53 like the writein to register 55 is a writeover operation. This difference in written operations is attributed to the need in memory 43 to recognize by erasing the character last printed where a new character can be written in while preserving all other stored input characters. The bit-by-bit synchronized circulation of the information in memories 43 and 44 under the control of clock 60 provides this same writein information to memory 44, obviating the need to erase used position numbers.

The third memory in the system comprises a single character parallel to serial shift register 53. The output of this register is connected to its input by line 77 to provide the continuous circulation of the information stored therein. Clock 60 synchronizes this circulation with the other memories and computation circuits to be described. The number stored in register 53 is the number of the print character which is about to align with the first column. Since each of the print characters are in a predetermined order and separated by an integral integer, i.e., one count higher than the preceding input print character, the number stored by register 53 provides an indication of the position of the font of print characters at any given instant.

Referring again to the algorithm $$F + C \stackrel{?}{=} N,$$

it is seen that F is the number stored by register 53 indicating font position, N is a number stored by memory 43 representing an input character, and C is the number stored by memory 44 indicating the columns for printing input character N. To provide the calculation of adding F to C and comparing this number with N, there is provided in FIG. 6 adder 41 and comparator 42. The basic computation performed by these units has already been described with reference to FIG. 5. FIG. 6 is not intended to be just a more detailed showing of the system shown in FIG. 5 but illustrates a preferred embodiment of the print selection system, i.e., a system which is suited for use with a printer in which the print characters are spaced to align with every second column. Thus, referring again to FIG. 3 it is seen that the first print character corresponding to code number 32 is opposite hammer 3 in the third column when the second print character corresponding to code number 33 is opposite hammer 5 in the fifth column. Thus, adder 41 in FIG. 6 is responsive to half of the value of each number stored in memory 44. The algorithm thus becomes $F + C/2 \stackrel{?}{=} N$ to accommodate there being half as many print characters along the print line as there are columns. For example, the print character at column 6 is the third print character from column 1.

In FIG. 6, lead 74, connecting memory 44 to adder 41, indicates that only half the value of each number stored in memory 44 is applied to the adder. Lead 74 is connected to storage unit 56 at the bit 55 position instead of the last bit 56 position thereby obtaining one half of the column number stored in this last memory position.

It should be noted that because only half of the column indicating number stored by memory 43 is utilized for computation, the number indicating the first column is binary 1 and not 0 as was the case for the general system described with regard to FIG. 5. Thus if 32 is the number of the print character approaching the first column and is also the number of the input character to be printed in column 1 one half of binary 1 which is zero is added to the print character indicating number 32 to result in 32 being compared with the input character number 32 for recognition of this printable character.

While the algorithm is satisfied by this one half fractional value of the column indicating numbers it is not uniquely satisfied since one half of an odd binary number is the same number as one half of the next lowest even binary number, i.e., one half of binary 6 is 3 and one half of binary 7 is 3. Thus, it is seen that one half of the series of sums at the output of adder 41 represent characters which are in position to be struck at the next printing and the other half of the series of sums falsely indicate print characters. Therefore, the coincidence indications resulting from comparisons made by comparator 42 between the series of sums available from 41 over lead 80 and the corresponding input character numbers from memory 43 falsely indicate printable characters on an average of 50 percent of the time. FIG. 6 accordingly includes a circuit to weed out the false indications of printable characters. This circuit is an inhibit circuit which is capable of recognizing which of the coincidence indications of comparator 42 are for print characters capable of being struck and which are false coincidence indications not representing print characters in position for being struck at the next hammer actuation. The inhibit circuit includes OR gate 84, AND gate 83, comparator 85 and inverting amplifier 93.

Three signals are necessary for the inhibit circuit to function. The first one on lead 71 from memory 44 indicates the column number corresponding to each number being compared in comparator 42. The second and third signals are applied to OR gate 84 on leads 86 and 87 and constitute indications of the odd or even sense of the columns which the print characters are approaching. The derivation of these signals, called the even compare signal and the odd compare signal, is described more fully with reference to FIG. 10. The odd compare signal is applied on lead 86 to both the comparator 85 and to OR gate 84. Comparator 85 compares the sense of the column indicating number from memory 44 with the presence or absence of the odd compare signal. Thus, when the odd compare signal is present, a binary one is applied to the comparator on lead 86. The first bit of the number from the memory indicates if it is odd or even. If the number is odd a 1 is present on line 71. Thus, if the odd compare period is called for and the column number is odd, an output from comparator 85 is applied over line 91 to AND gate 83 as well as an output from the OR gate 84 over line 88 resulting in a noninhibit signal being applied over line 92, through inverter amplifier 93 and over lead 94 to comparator 42. During the instance where print characters are about to align with even columns, the even compare signal is applied to OR gate 84 and nothing is applied to comparator 85 such that when the column indicating number is even there will be a zero applied to comparator 85 which results in a coincidence and therefore an output from comparator 84 to the AND gate 83, and once again a noninhibit output is applied to comparator 42. It is recognized that the effect of the inverter 93 is that when there is an output from AND gate 83 this appears as no output from amplifier 93 and there is no inhibiting of the coincidence indication whereas at other times when there is no output from AND gate 83 this will appear as an inhibit signal on lead 94 and coincidence indications will be inhibited at these times.

Much the same as was described for the system shown in FIG. 5, the output from the comparator on line 82 is applied both to input memory 43 over line 82 and to a column decoder 46. First considering the action at the printout end of the system, column decoder 46 also receives the number representing the column which is currently being applied to the adder 41. (It is noted that only half of this number is applied to adder 41.) This number is applied over line 71, through the serial to parallel converter 78, and over lines 81 to column decoder 46. Column decoder 46 can comprise a number of decoding or readout devices such as AND gates each responsive to a different one of the eighty different column numbers and also to a coincidence indicating pulse over line 82 from comparator 42. Each output channel of the decoder shown as C1, C2....C80, there being one for each column, is energized by the number corresponding to that column from memory 44. Since the numbers from the memories are treated seriatim by adder 41 and comparator 42, the column indicating number applied to the adder simultaneously energizes the output channel of decoder 46 for that number. The channel energized, such as for example that corresponding to column 40 (C40), which receives a coincidence indication from comparator 42 applies a signal over 76 which activates a memory 47 which in turn energizes a print actuation means. The print actuation means is thereby enabled to trigger its hammer upon receipt of the power pulse which immediately follows the compare period.

The storage unit 47 provides for a simultaneous printout at the columns where printable characters have been located during the compare period. These are eight characters stored in the memory and there is a complete circulation of the memory for each position change of the print characters, but because there are only print characters available for half of the eight columns being considered at any one time, a maximum of four characters can be printed at any one time.

The output of comparator 42 is also applied via line 82 to the erase gate 51 of memory 43. The presence of this signal opens gate 51 such that the character which was just compared in comparator 42 and which is also the character which was simultaneously circulated to input register 50 via lead 64 is removed by gate 51 and is not circulated into storage unit 52. Thus, erase gate 51 removes the input character which has resulted in a printable character from memory 43 and the space remaining in its place is recognized by the less than 32 detector. Details of the erase gate will be described below with reference to FIG. 9.

Figure 8:
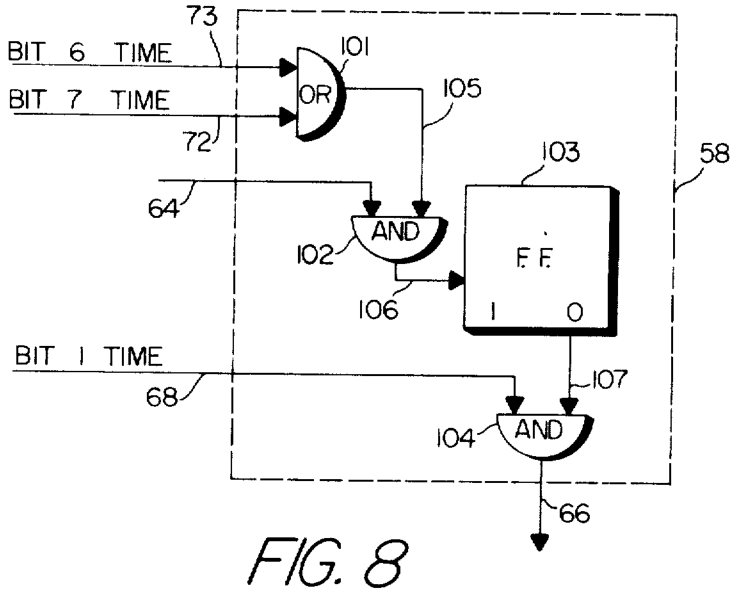
FIG. 8 is a detail of a less than 32 detector for the print selection system shown in FIG. 6.

Referring now to FIG. 8 there is shown a detail of the less than 32 detector 58. The function of this detector is to determine when there is a space in the input register 50 of memory 43. A space is defined as the absence of a number in the range of numbers between 32 and 127. One characteristic of the binary numbers within the range of 32 and 127 is that they must have a one appearing either in the binary 32 or the binary 64 position. Thus, the less than 32 detector, by means of connections 73, 72, OR gate 101 and line 105, looks at the character being placed into the input register 50 at bit 6 time and at bit 7 time. If during bit 6 time, as established by the signal on line 105, there exists a binary one on line 64 the output from AND gate 102 available on line 106 sets flip-flop 103 to provide a zero output at the reset output. At bit 1 time AND gate 104 permits this absence of a space signal on line 107 to be applied to AND gate 57 and register 55 on lead 66. Bit 6 time and bit 7 time are applied to OR gate 101 so that all numbers 32 and greater are detected. The output 66 from the detector is applied both to the AND gate 57 and to the parallel to serial converter 55 to occasion simultaneous writein to registers 55 and 50.

Figure 9:
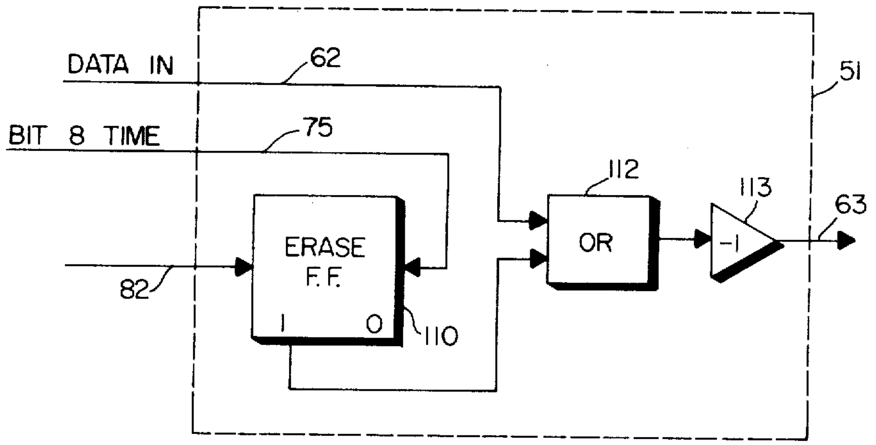
FIG. 9 is a detail of an erase gate for the print selection system shown in FIG. 6.

Referring now to FIG. 9 there is shown a detail of the erase gate 51. The purpose of the erase gate is to eliminate those characters from the input memory which have resulted in the recognition of printable characters. The coincidence indication from comparator 42 is applied to erase flip-flop 110 to cause it to be set. This signal from the comparator 42 appears at the erase flip-flop at bit 8 time. The reset signal for this flip-flop from the divide by 8 flip-flop 59 appears at the next bit 8 time on line 75 and causes the flip-flop to be reset. When flip-flop 110 is set a 1 appears at OR gate 112. This 1 is applied to OR gate 112 for the full character time between the set and reset pulses to flip-flop 110. Thus, regardless of the value of the input data from the input register 50 appearing on line 62 which is also applied to the OR gate 112, a one for each bit will appear at the output of OR gate 112 which is inverted by invert amplifier 113 to appear as zeros at output line 63 for each bit of the 7 bit character. Thus, the function of erase gate 51 is to have zeros appear for the next character time after a coincidence indication is made at comparator 42. The effect thus is to erase the character which is in the input register 50.

FIG. 10 shows a signal generation system for deriving control voltages to control the computation period of the print selection system and the print actuation function of this system. The signals are derived from the photosensors which are shown in position in FIG. 2. In FIG. 10 photosensors 33 and 33*a* are shown placed behind a shield 120 containing apertures 121 and 122. Fingers 21 representing print characters A, B and C are shown passing in front of the shield 120 to first block the light from the odd photosensor and then from the even photosensor with the passage of the print characters from right to left. This direction of movement does not correspond to the position of the light source and photosensors shown in FIG. 2. The showing in FIG. 10 corresponds to a positioning of the sensors to detect those fingers adjacent the paper 23.

Figure 11:
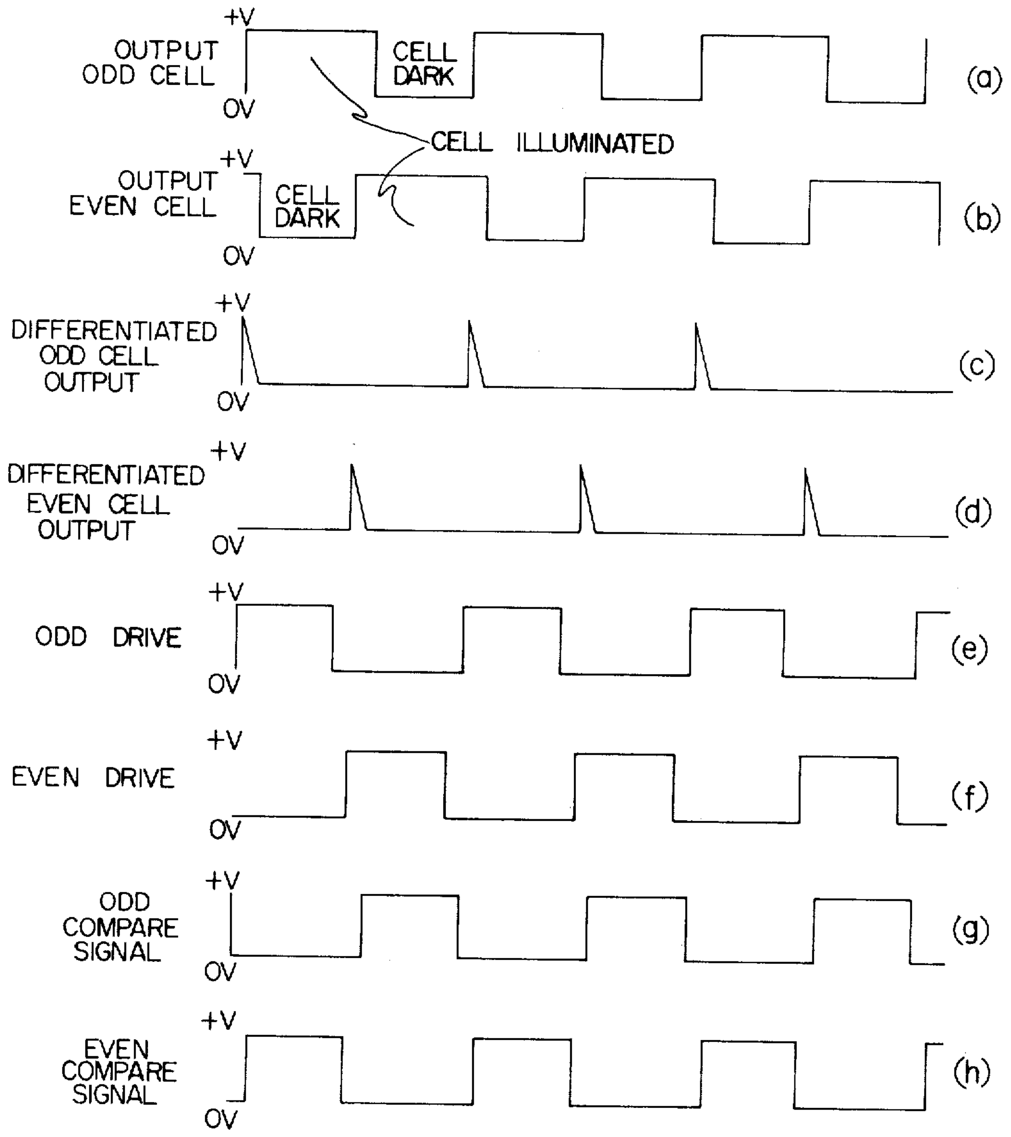
FIG. 11 is a chart of the timed operating voltages developed by the system shown in FIG. 10.

Referring now to FIG. 11 there is shown the output at (*a*) of the odd column sensor 33 and at (*b*) the output of even column sensor 33*a*. The zero and plus volts legend at the left of each graph in FIG. 11 indicates the presence of light when a positive voltage output is realized from the cell and no receipt of light at zero volts output. Accordingly, the first voltage pulse in graph (*a*) indicates the odd cell is illuminated. The following absence of a pulse indicates the cell is dark. Thus it can be seen that since the spacing between the fingers is greater than the width of the fingers the period of light on the cells is greater than the period of darkness. The spacing of the apertures and the distance between and size of the fingers result in only one cell being dark at any one time. Each one of the outputs of the photocells is differentiated as shown at (*c*) and (*d*) of FIG. 11. The differentiators are not shown in FIG. 10. FIG. 10 only illustrates the major functions which are necessary to be performed to provide control of the print selection system. Application Ser No. 734,500, filed June 4, 1968 by the assignee of the present application discloses a complete system for deriving the signals necessary for controlling the print selection system described herein.

FIG. 10 shows that the differentiated outputs of the photosensors are applied to timers 125 and 126 via leads 34 and 34*a*. Looking first to the circuitry for the odd cell of output, there is shown in FIG. 11 at (*e*) the odd drive voltage obtained from timer 125, flip-flop 123 and amplifier 131. The differentiated odd cell output sets flip-flop 123 and initiates timing of timer 125 which when it times out resets flip-flop 123. The output of the flip-flop is amplified and appears as the odd drive voltage. This is the power signal which is applied to the print actuators, e.g., the hammer solenoids for those hammers in the odd numbered columns. Timer 126, even drive flip-flop 124 and amplifier 132 result in the waveshape shown in FIG. 11 at (*f*) for the hammers in the even numbered columns.

FIG. 10 shows that the differentiated odd cell output is applied to a delay circuit 129, the output of which sets even compare flip-flop 128, which is reset by the differentiated even cell output. The resulting even compare signal is shown in FIG. 11 at (*h*). Delay circuit 130 connected to the differentiated even cell output sets odd compare flip-flop 127 which is reset by the differentiated odd cell output to result in the odd compare signal shown in FIG. 11 at (*g*).

It is noted from comparing (*f*) and (*h*) of FIG. 11 that the even drive voltage begins immediately after the even compare signal. Thus, the even compare signal marks the time for the computation of the system shown in FIG. 6 to take place when print characters are approaching even numbered columns. Immediately after this period a drive signal is applied to the hammer drive 47 on lead 134. It is noted that lead 134 is connected to the output of amplifier 132 in FIG. 10. Lead 134 is shown supplying the input to the hammer drive circuit 47 because it is the hammer drive connected to the even numbered column 40 output of decoder 46. The column hammer drive 41 would receive an input from lead 133 which is connected to the odd drive amplifier 131.

It was noted in observing the waveforms shown at (*a*) and (*b*) in FIG. 11 that only one photocell is dark at any one time due to the positioning of the apertures, the size of the print fingers and the spacing between them. This relationship enables a unique situation of having both photocells dark at one instant of time corresponding to the first character in a font being adjacent the first column. This can be accomplished by having the finger adjacent the odd photosensor 33 widened to block light from this photosensor at the time the adjacent finger is blocking light to even photosensor 33*a*. Thus, one wide finger in each font of print characters is spaced such that both photocells are blackened when the first print character in the font is adjacent the first column.

FIG. 10 shows a logic circuit 36 connected to finger counter 40 and to leads 34 and 34*a*. Logic block 36 basically provides an AND function, i.e., a reset pulse is applied to finger counter 40 by this logic circuit when both cell outputs are dark. Since finger counter is limited in its count to numbers in the range 32 to 127, the counter is reset to binary 32 at this font indicating signal. The above-identified application docket number 45-SLO-1039 is again referenced for further detail of the operation of the resetting of counter 40.

Referring once again to the four algorithms discussed above it is noted that each one involves a computation. Some computations involve addition of numbers and the others involve subtraction. This computation may result in a number which is outside the range of the code for print characters. For example, if it were desired to print the character represented by the number 42 in the 70th column and if the number of the print character adjacent the first column corresponded to the code number 105 then the resulting number from the addition F + C in the adder 41 would result in a number 175 which is outside the range of the code 32 through 127. Accordingly there is shown in FIG. 12 a detail of the adder 41 and comparator 42 which has the capability of accommodating numbers outside of the code range and reconstituting these numbers to their equivalent within the code range.

Figure 12:
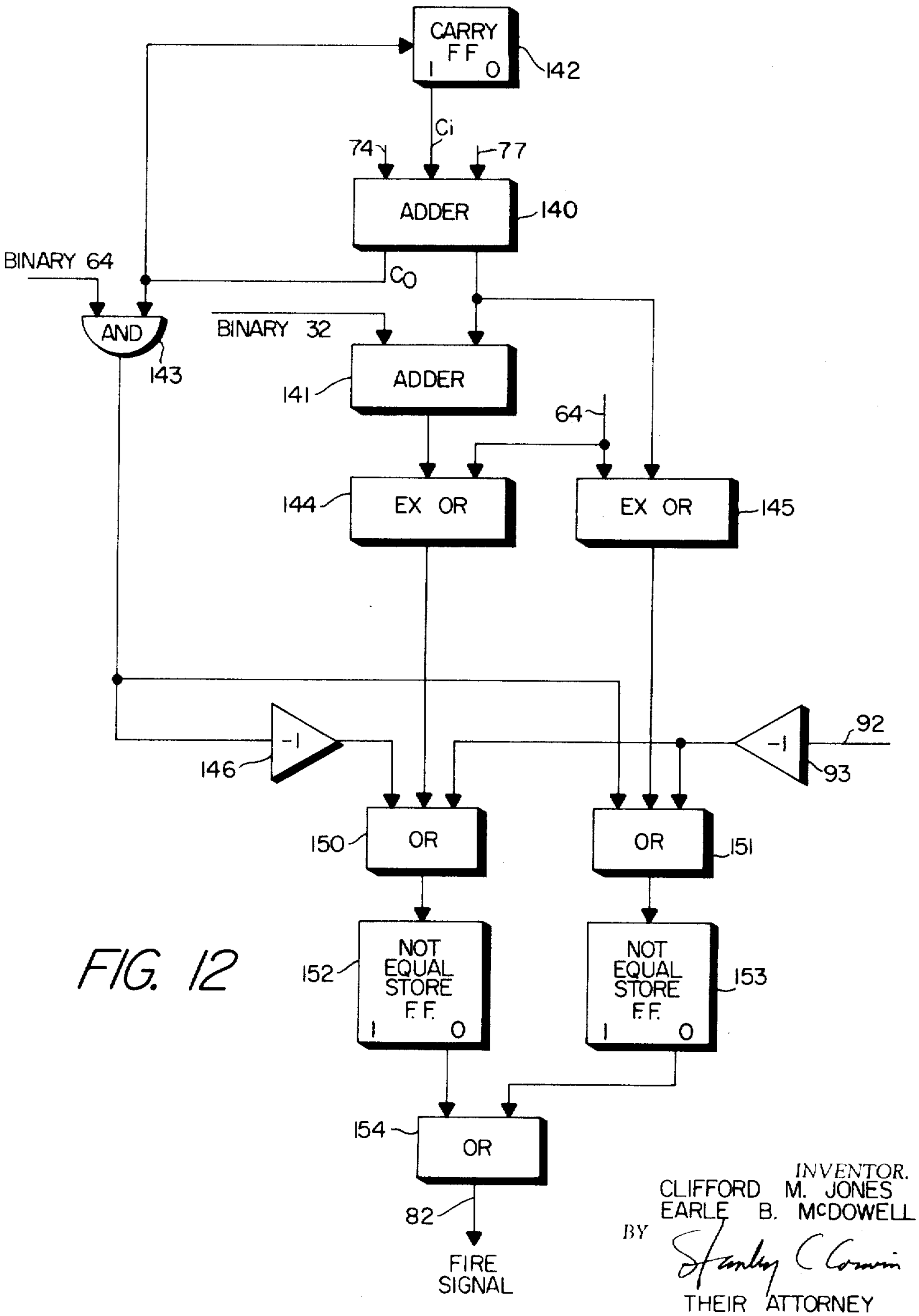
FIG. 12 is a detailed block diagram of the adder and comparator of the print selection system of FIG. 6.

Basically, the computation system shown in FIG. 12 has a first path for numbers within the code range and a second computation path for numbers outside the code range. Since the computation being performed is that of addition the second path is for numbers above the range. A first adder 140 is responsive to the output from the font position register 53 via line 77 and also to the column indicating numbers from memory 44 over line 74. It is not know at this point whether the sum is greater than the code maximum of 127 or not. The output of adder 140 is applied to a second adder 141 and also to a comparator in the form of an exclusive OR circuit 145. If the output from adder 140 is greater than 127 it can be reconstituted by subtracting the number 128 and adding 32. This can be readily seen since if the number were one greater than 127 it would be 128. Bu subtracting 128 zero is obtained and by adding the first number in the code 32 is obtained. Thus, instead of being the first number greater than the code it becomes the first number in the code. The reconstitution is merely a recycling of the numbers back into code acceptable numbers. Since 128 takes the form of a one in the eighth bit position and since the characters within the code are only 7 bit characters it is unnecessary to subtract 128 as it would not be recognized. Thus, merely the addition of binary 32 to the output from adder 140 accomplishes the reconstitution. Adder 141 accordingly receives the output of adder 140 and also binary 32 to constitute the first element in the second computation path.

Now examining the path for numbers within the code range it is seen that the output of adder 140 is applied to the comparator 145 and numbers from the input memory on lead 64 are also applied to this comparator. Exclusive OR 145 presents a zero output when both inputs are the same, i.e., when there is a comparison and a binary one output at all other times. If there is a comparison and the output from the exclusive OR 145 is zero and there is no other input to OR gate 151 then the not equal store flip-flop 153 which receives the output of OR gate 151 will not be set and a one will appear at the reset output from this flip-flop causing an output to appear at output lead 82. The output from exclusive OR gate 145 forms one input to OR gate 151. The second input is from the inhibit circuit shown in FIG. 6 which prevents a coincidence indication from appearing at the output of the comparator 42 if there is not coincidence in the odd/even sense between the columns of next print character alignment and the column in which the character being evaluated is to be printed. Thus, for example, if a coincidence indication is obtained for a character which is to be printed in an even numbered column and the print characters are about to align with odd numbered columns then an inhibit signal will be applied in the form of a binary one to OR gate 151.

The third input to OR gate 151 is a signal indicating whether the output of adder 140 is within or without the range of the code. This input comes from AND gate 143 which examines the carry output of adder 140 between the seventh and eighth bit positions. A carry flip-flop 142 is shown indicating the carry loop for adder 140. The carry signal is received by AND gate 143 with binary 64 forming the second input. The ANDing of binary 64 with the carry output insures that the carry between the seventh and eighth bit positions is examined. Binary 64 is the bit 7 time signal. Thus, if at bit 7 time there is an output $C_O$ from adder 140 on the carry line then the number in the adder is greater than 127 and AND gate 143 presents a logic 1 output to OR gate 151. This binary 1 inhibit output sets the not equal store flip-flop and a 0 output is derived from the reset side thereof. The indication from AND gate 143 of a number greater than 127 is also applied to OR gate 150 through an inverter 146 so that a logic 0 appears at OR gate 150 and there is thus no inhibit signal applied to this second path which serves numbers greater than 127.

Figure 13:
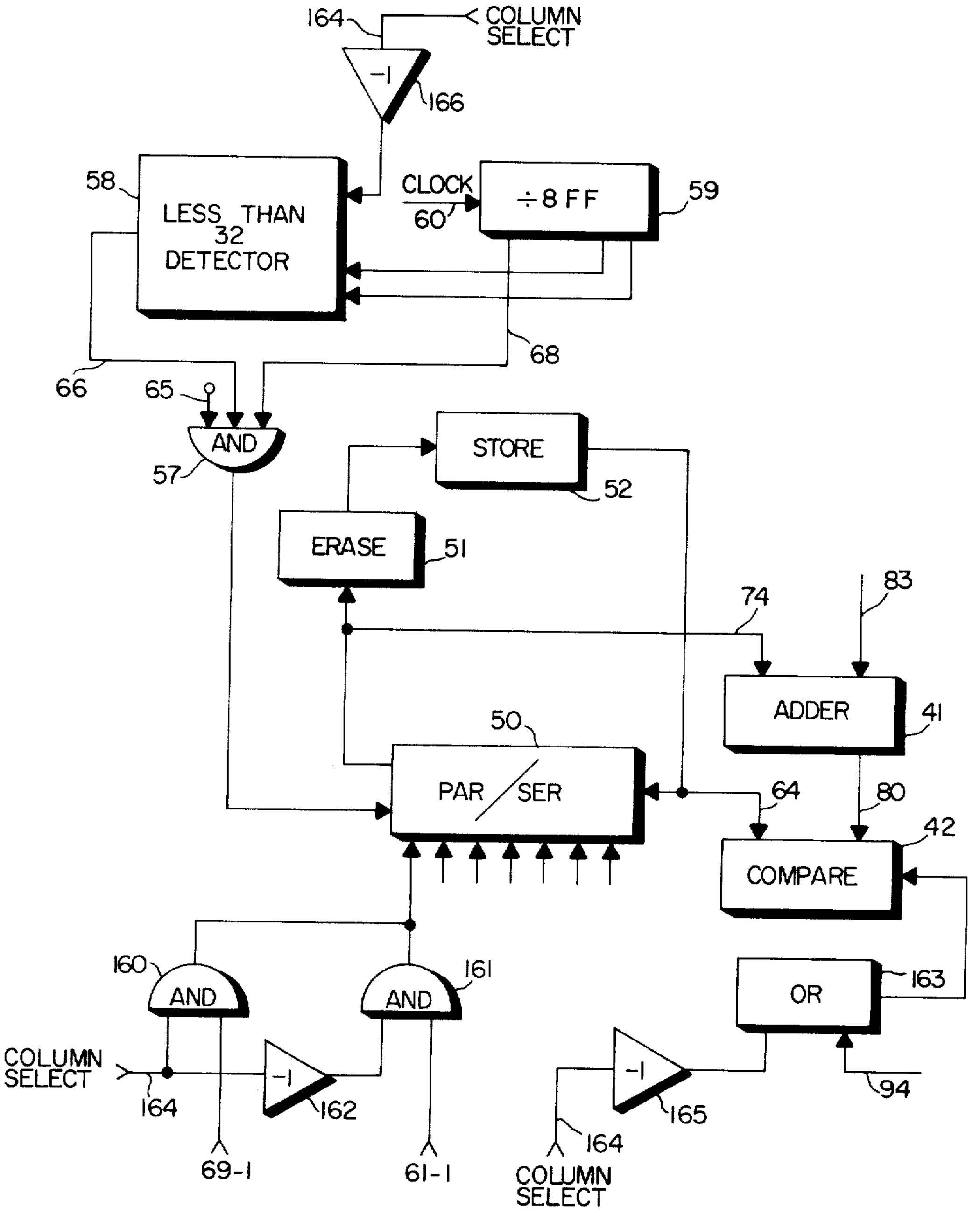
FIG. 13 is a block diagram of an alternative embodiment of a print selection system.
Figure 14:
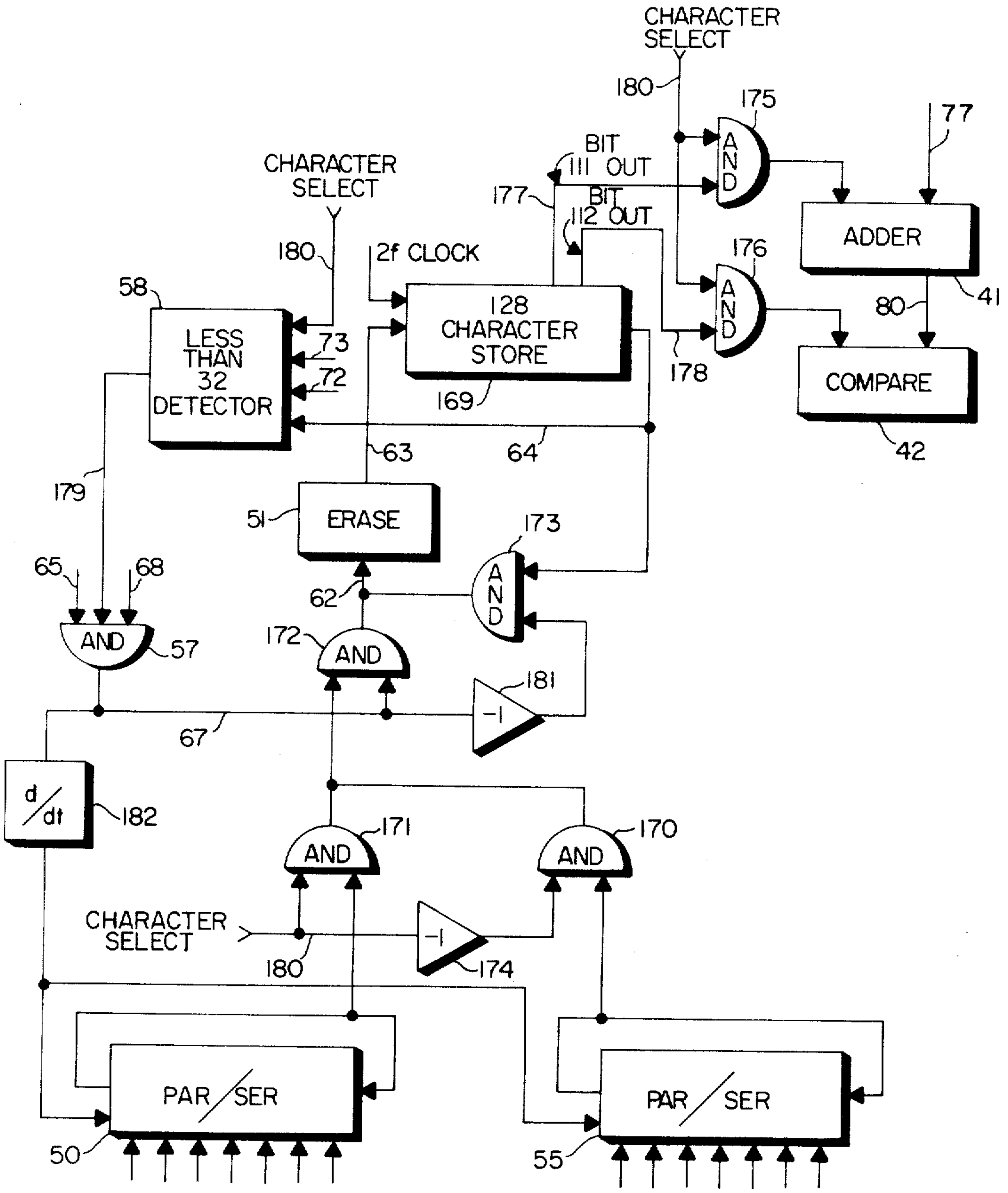
FIG. 14 is another alternative embodiment of a print selection system.

FIGS. 13 and 14 show alternative embodiments of the storage portion of the system shown in FIG. 6. Both of the embodiments in FIGS. 13 and 14 perform the computation set forth in algorithm 1, $F + C \overset{?}{=} N$. The system in FIG. 6 has a first memory for storing numbers representing input characters and a second memory for storing the number for each input character which indicates the column it is to be printed in. It is not necessary to have two separate memories. FIGS. 13 and 14 show a system in which one single memory stores both the input character number and its paired print position number.

To understand the system shown in FIG. 13 it is first necessary to look at the inputs to the memories 43 and 44 in FIG. 6. Each memory has a parallel input, the input to memory 43 being on lines 61 and the input to memory 44 being on lines 69. For the purpose of FIG. 13, the left-most input lead of each of these memories will be assigned the number 1 so that the first lead for register 50 in FIG. 6 is 61-1 and the first lead for register 55 is 69-1.

Referring now to FIG. 13 there is shown a system for storing input character and corresponding print position numbers in a single memory on a character by character basis. The single memory unit which is utilized is memory 43 as shown in FIG. 6. Here, however, the input leads to the parallel to serial shift register 50 are connected either to an input character number or to the number indicating the column position for printing that input character by a logic toggle switch including AND gates 160 and 161 and the inverter 162. While only one such logic switch is shown, it is recognized that there is a corresponding logic switch for each of the seven inputs to the parallel to serial register 50. One pole of this logic toggle switch is connected to receive the first bit of the input character on lead 61-1. Thus, AND gate 161 is connected to lead 61-1. The other position of the toggle switch is connected to receive the first bit of the column indicating number on lead 69-1 via AND gate 161. The switching function is provided by the other input to each AND gate which is the column select signal. The two AND gates 160 and 161 are connected together at the first lead to parallel to serial register 50.

The column select signal indicates that a column indicating number is to be received when it is a logic 1. When it is a logic 0 it indicates time to write in the input character number. The column select signal is applied to AND gate 160 and the inverse thereof is applied to AND gate 161. The inversion is occasioned by inverter 162.

The effect of selecting first the column number and then the character number is to cut the capacity of the memory in half, that is only half as many characters are stored for the same size memory. Another effect of this side-by-side storage is that the character number and column number must be separately picked out of the memory for the computation process. Thus, the column number which leads the character number can be taken out at the input to the register 50 on lead 74 and applied to the adder 41 as shown. The input register 50, being a one character storage unit, serves to provide a one character separator between character numbers and column numbers so that the input character number is read out of the memory 43 at the output of unit 50 and applied to comparator 42 on lead 74. Thus, the circulating column indicating number is picked off at a position one character ahead of the input character number so that the computation involving both numbers can be performed at one time.

Another problem with number readout in the side-by-side storage shown in FIG. 13 is that unless readout of the two numbers from the memory is synchronized with the position of these two numbers in the memory, input character numbers could be applied to the adder and column indicating numbers applied to the comparator half of the time. To correct this situation the column select signal is applied through inverter 165 and over line 164 to the comparator through OR gate 163. This OR gate also receives the inhibit signal from the inhibit circuit shown in FIG. 6 over lead 94. Thus, whenever the column select signal is in the binary 1 state indicating writein of a column number, the column number is in position to be applied to adder 41 and the input character number is in position to be applied to comparator 42. Inverter 165 inverts the binary 1 to a binary 0 at the input of OR gate 163 so that no inhibit signal is applied to the comparator at this time. The inverted column select signal is applied also to the less than 32 detector as shown to insure that the number being observed is an input character number and not a column number.

It is noted with regard to FIGS. 13 and 14 that some leads and reference numbers are missing. Leads which are missing in these figures are shown in FIG. 6 and therefore have been omitted for the purpose of simplicity.

In the storage system shown in FIG. 13 the eight character memory of FIG. 6 is used to store both character numbers and print position numbers. This memory is thus capable of storing half the number of characters and in order to operate the printer at the same speed the print selection system utilizing the FIG. 13 memory scheme must be driven at a clock time of twice the frequency. FIG. 7 at (*g*) shows this 2*f* clock signal.

Referring now to FIG. 14, there is shown a second embodiment of a single storage unit for storing both input character indicating numbers and print position numbers for these characters. This scheme utilizes a bit-by-bit interlacing of numbers such that each stored number is 16 bits long, the first bit being for the character indicating number, and the second bit being the first bit of the column indicating number. Thus the first 8 odd positioned bits contain input character information and the first 8 even positioned bits comprise the column indicating number. The parallel to serial shift registers 50 and 55 for receiving the two different numbers are the same registers shown in FIG. 6. Register 50 receives and stores each input character and register 55 receives and stores the corresponding column number. AND gates 171, 170 and inverter 174 constitute a logic toggle switch selecting alternately the contents of the two registers 50 and 55. A character select signal is applied to each AND gate to cause the alternate gating of the contents of registers 50 and 55 into the main storage unit 169. The character select signal as shown in FIG. 7 at (*h*), changes state once within each bit time so that during one bit time the first bit of each of the numbers to be entered into storage unit 169 can be written in. Thus, when the character bit select signal is in the logic 1 state a bit from register 50 can pass through AND gate 171. Inverter 174 at this time applies a logic 0 to AND gate 170 and there will be no input from register 55. On the next half cycle of the character bit select signal the reverse operation takes place.

The output of AND gates 170 and 171 is applied to a second logic toggle switch made up of AND gates 172, 173 and inverter 181. The second switch selects writein or circulate. The switch controlling signal is the writein signal from AND gate 57 which is the same AND gate shown in FIG. 6. AND gate 57 also controls the writein for registers 50 and 55 via differentiator 182. Differentiator 182 provides a short duration pulse to these registers to enable writein.

Since each number stored by the storage unit 169 is a 16 bit number, this memory is selected to have the same eight number capacity as memory 43 in FIG. 6. Accordingly, storage unit 169 can store 128 bits. In order to operate the print selection system at the same speed, memory unit 169 has its information circulated at twice the speed by a double frequency clock. This clock signal is shown again in FIG. 7 at (*g*).

Readout of the numbers stored in memory unit 169 is accomplished by applying the information in the 112 bit position to comparator 42 and applying the information in the 111 bit position to adder 41. The 112 bit position is selected because it is one stored number (16 bits) behind the last number position in the register. Thus, the number applied to the computation circuits is preserved in this last number position so that it can be erased if a coincidence indication is obtained. To insure that the input characters are applied to comparator 42 and the column numbers are applied to adder 41, the character select signal is ANDed with each of these inputs to the computation circuits through AND gates 175 and 176. Thus, when the character select signal is in the binary 1 state character information is at bit position 112 and column information at bit position 111. It is also noted that the less than 32 detector has the character select signal applied to it such that only those bits representing the input character portion of the stored number are detected for the presence of an erased number.

It should be noted in regard to FIGS. 13 and 14 that the systems there shown are suitable for a print system where the print characters align with every column position. Thus, unlike FIG. 6, where one half of the value of each column indicating number is applied to the adder, in FIGS. 13 and 14 the full value of the numbers indicating print position are applied to the adder 41. It is a simple matter to obtain half of this value by the same technique used in the FIG. 6 system for printers where the print characters alternately align with even and odd numbered columns.

It has been noted with reference to FIG. 6 that the clock 60 which is shown being applied only to the divide by 8 flip-flop is in fact applied to each of the storage and computation units throughout the system to provide for synchronized handling of the numbers. This clock or the 2*f* clock, as has been described, is applied throughout the systems shown in FIGS. 13 and 14. It should also be noted that the flip-flops which are used in different portions of the system, e.g., the less than 32 detector flip-flop 103, have no reset means shown. This was done for the sake of keeping the drawings free from extraneous connections and devices not necessary to understanding the invention. The reset pulse for the flip-flops is derived by the divide by 8 flip-flop and could, for example, be bit 8 time for those flip-flops sensitive to bit 1 time information. In the case of flip-flop 103 shown in FIG. 8, which stores bit 6 time or bit 7 time information until bit 1 time, this flip-flop could be reset by a bit 2 time pulse.

The print selection system which has been described is particularly adapted for use with a printer in which print intelligence circulates parallel to the print line. It is a system in which high speed is obtainable by plural character printout. It is also a low cost system since serial computation is utilized throughout, requiring only partial line memory and one computation circuit for the system instead of individual computation circuits for each print position as is common to line printers.

The system has been described with reference to a preferred embodiment and to alternative methods of information storage, all responding to a single algorithm, $F + C \stackrel{?}{=} N$. It has been pointed out and it is stressed here again that there are at least three other known equivalent algorithms which satisfy print selection systems for printers of the type described. These alternative algorithms have been pointed out as an indication of the scope of the invention. It has also been pointed out that the print selection system is capable of accommodating printers where print characters are spaced to align with every print position and also print characters which are spaced to align with less than every print position. It is therefore intended that the foregoing description be taken as an example of the invention set forth and not as an indication of the scope of the invention which is intended to be determined only by the appended claims.

What is claimed as new and desired to be secured by Letters Patent of the United States is:

1. In a printer having a print character carrier with a plurality of different print characters spaced apart and arranged thereon in a predetermined sequence, said printer including selectively energizable means for causing a desired character to be printed on a recording medium at a desired column location, the character carrier of said printer being driven past adjacent columns at a substantially constant speed, a print selection system comprising:

a circulating memory unit for receiving and serially circulating input data character signals, said unit containing plural character storage capacity, the rate of circulation of said unit being dimensioned such that a plurality of data characters received by said memory unit are circulated in the memory unit during the time a print character is passing between adjacent columns, means for generating sum signals, each sum signal indicating a particular print character at a particular column location, means for serially comparing each of the circulating data character signals in the memory unit to a different sum signal, each equal comparison denoting agreement of the compared data character with the print character at the particular column location, printout means responsive to each equal comparison to cause the related character to be printed at the associated column location, and means responsive to each equal comparison for causing removal of the equally compared data character signal from the memory unit, whereby a new input data character signal may be received by the memory unit.

2. A character coincidence indicator for a printer wherein the printer has print characters arranged in a predetermined order, spaced to align with every *n*th print position where *n* is an integer, and adapted to move parallel to the print line, said character coincidence indicator comprising:

a first memory responsive to received input characters for storing respective numerical representations identifying each of said input characters, a second memory responsive to receipt of input characters by said first memory to store a numerical representation indicating the order of receipt of such input character, the stored order numerical representation also indicating the position on the print line for printing the associated input character, a third memory responsive to print character position to store the numerical indication of the print character at a reference print position along said print line, the numerical representation of said third memory being the same as the numerical representation of said first memory for a corresponding character, combining means combining the numerical representation in said third memory with a number equal to the fraction $1/n$ of each numerical representation stored by said second memory to form a series of such combined numerical representations, and comparison means responsive to each numerical representation of said series of numerical representations and to each associated numerical representation from said first memory for providing an indication of coincidence thereof.

3. A character coincidence indicator as recited in claim 2 wherein said print characters are spaced to align with every print position in the print line, *n* being 1, and further including printout means responsive to said coincidence indication to cause the print characters associated with the coincidence to be printed.

4. A character coincidence indicator as recited in claim 3 further comprising said first memory dimensioned to have a capacity for storing a sufficient number of input characters to buffer the difference between worst case single character print speed and the rate of receipt of input characters.

5. A character coincidence indicator as recited in claim 4 wherein said printout means includes a fourth memory for storing an indication of each coincidence indication for the duration of the comparison of the contents of said first memory with said series of numerical representation enabling simultaneous printout of selected print characters.

6. A character coincidence indicator as recited in claim 5 further including means for circulating the information stored by said first and second memories in synchronization, wherein the information stored by said memories is stored in series and the operations of said combining means and said comparison means are serial operations.

7. A character coincidence indicator as recited in claim 6 wherein said printout means includes print actuation means for each print position and print position decoding means having a signal output channel for each print position, each numerical representation from said second memory appearing at said combining means energizing the channel of said print position decoding means of like print position designation, each energized channel when triggered by a coincidence indication from said comparison means producing an output signal for energizing the associated print actuation means.

8. A character coincidence indicator as recited in claim 7 wherein said print actuation means includes said fourth memory, said fourth memory comprising a storage unit for each print position for storing channel output signals from said print position decoding means for the duration of a comparison period enabling simultaneous printout of selected print characters.

9. A character coincidence indicator as recited in claim 6 further including feedback means coupling each coincidence indication of said comparison means to said first memory to erase the numerical representation of the character causing the coincidence indication.

10. A character coincidence indicator as recited in claim 9 further including writein control means controlling the receipt of input characters by said first memory and the writein of numerical representations to said second memory, said writein control means being responsive to the presence of an input character at the first memory and a space for receipt of a character at the input position of said first memory to actuate writein at said first and second memories.

11. A character coincidence indicator as recited in claim 10 further including a sensor for generating a signal in response to the passage of each print character by said sensor, said third memory being responsive to the sensor signal for registering the numerical representation of the print character adjacent the first print position on said print line, means for selecting said reference print position to be the position adjacent the first print position, means responsive to each print character arriving adjacent the first print position to register in said third memory a numerical representation different than that registered for the preceding print character in response to each signal from said sensor;

said third memory responsive to said sensor to be reset to the numerical representation of the first print character in said order of print characters when said first print character is adjacent the first print position.

12. A character coincidence indicator as recited in claim 1 wherein the numerical representations for said input characters and said print characters represent numbers corresponding to a standard code, and wherein said combining means contains means for reconstituting each numerical representation of said series of representations which exceeds the maximum value of the numbers in said code equivalent numbers within the code to enable detection of coincidence by said comparison means.

13. A character coincidence indicator as recited in claim 2 wherein said print characters are spaced to align with every second print position in the print line, *n* being 2, and further including printout means responsive to said coincidence indication to cause the print characters identified by the coincidence to be printed, and inhibit means responsive to print character position to prevent said printout means from responding to coincidence indications for those print positions with which the print characters will not align at the present print time for printing.

14. A character coincidence indicator as recited in claim 13 wherein said printout means includes a fourth memory storing an indication of each coincidence indication for the duration of the comparison of the contents of said first memory with said series of numerical representations enabling simultaneous printout of selected print characters.

15. A character coincidence indicator as recited in claim 14 further including means for circulating the information stored by said first and second memories in synchronization, wherein the information stored by said memories is stored in series and the operations of said combining means and said comparison means are serial operations.

16. A character coincidence indicator as recited in claim 15 wherein said printout means includes print actuation means for each print position in the print line and print position decoding means having a signal output channel for each print position, means for energizing the channel of said print position decoding means of like print position designation in response to each numerical representation from said second memory corresponding to the fractional counterpart thereof applied to said combining means, each energized channel responsive to a noninhibited coincidence indication from said comparison means for producing an output signal for energizing the associated print actuation means.

17. A character coincidence indicator as recited in claim 16 further including feedback means coupling each noninhibited coincidence indication of said comparison means to said first memory to remove the numerical representation of the character selected for printing.

18. A character coincidence indicator as recited in claim 17 further including a sensor generating a signal in response to the passage of each print character by said sensor;

said third memory being responsive to the sensor signal for registering the numerical representation of the print character adjacent the first print position on said print line, means for selecting said reference print position to be the position adjacent the first print position;

means responsive to each print character arriving adjacent the first print position to register in said third memory a numerical representation different from that registered for the preceding print character in response to each signal from said sensor;

said third memory being reset by said sensor to the numerical representation of the first print character in said order of print characters when said first print character is adjacent the first print position.

19. A character coincidence indicator as recited in claim 18 wherein said sensor includes means for generating a first signal indicating the approach of print characters to even numbered print positions for the next printing ans a second signal for the approach to odd numbered print positions;

said inhibit means responsive to said first and second signals for comparing them with the odd-even sense of the numbers in said second memory and for inhibiting coincidence indications to said printout means whenever there is not coincidence between the odd-even sense of the numbers in said second memory and said first and second signals.

20. A print selection system for a printer wherein the printer has a plurality of individually different print characters arranged in a predetermined order and adapted to move during printing such that said print characters move from column to column along a print line, said print selection system comprising:

a source of stored pairs of indications wherein each pair of indications defines an input character and the column at which said input character is to be printed, means for producing an indication for each column change in print character position, means for examining said pairs of stored indications with each change in print character position indication to indicate characters to be printed, means for extracting a column indication corresponding to an indicated character to be printed from the stored pair of indications, and means responsive to the column indication for an indicated character to be printed to cause printout of such print character in the column indicated by the column indication.

21. A communication terminal comprising:

a receiver responsive to input information from an external source, and a printer coupled to said receiver for printing said input information on a recording medium, said printer having its print characters arranged in a predetermined order and adapted to move during printing such that print characters circulate from column to column across the recording medium, said printer being controlled by a print selection system comprising:

input means responsive to said input information for receiving a numerical indication representing each of the input characters comprising said input information, column number generating means for generating a numerical indication for each input character indicating the column at which the input character is to be printed, memory means for storing a pair of numerical indications, each pair of numerical indications containing input character and printout column intelligence, means coupled to said input means, said column number generating means and to said memory means for obtaining at least part of one numerical indication of each pair of stored numerical indications from said input means and the other numerical indication of each pair from said column number generating means, means for producing an indication for each column change in print character position, means for examining said pairs of stored numerical indications with each change in print character position indication to indicate characters to be printed, means for extracting a column indication corresponding to an indicated printable character from the stored pair of indications, and means responsive to the column indication for an indicated printable character to cause printout of such print character in the column indicated by the column indication.

22. In combination, means for providing serially occurring electrical signals representative of input characters to be recorded at desired locations wherein each character is uniquely defined by the value of a signal N, means for providing a respective column indicating signal C for each of said N signals having a value defining the desired column location where each of said input characters is to be recorded, a memory, means for separately storing said N and C signals in said memory, a recording means comprising a plurality of recording characters corresponding to said input characters wherein said recording characters are adapted for effective serial movement across a line containing column locations, means for sensing the column location of said recording characters during movement to provide signals F having values defining with time the column locations of each of said recording characters, means responsive to the signals in memory for computing for each successive value of F, the successive remainder values of K for each associated value of N and C signal according to the relationship of $F + C - N = K$.

23. An arrangement according to claim 22 comprising means for generating recording signals in response to a predetermined value of K, and means responsive to said recording signals to cause said recording characters to record said input characters at said desired locations.

24. An arrangement according to claim 23 wherein said memory comprises two separate memories and means for serially circulating each of said N signals in one of said separate memories in known timed relationship with the serial circulation of each of said C signals in the other of said separate memories.

25. An arrangement according to claim 22 further comprising means for serially circulating all of a plurality of N and C signals through separate memories within the time period of each movement of said recording characters across a column location, means for computing the remainder values of K for each of said last-named N and C signals during said period, means to generate recording signals in response to a predetermined value of K, and means responsive to said recording signals to cause said recording signals to record the input characters defined by the N signals associated with the predetermined values of K at the desired column locations.

26. An arrangement according to claim 25 wherein said means to record the input characters comprises means to cause said recording signals to simultaneously record at the desired column locations all of such input characters defined by the N signals associated with the predetermined values of K at the end of said time period.

27. An arrangement according to claim 26 comprising means for removing from memory the N signals representative of the input characters which have been recorded and substituting therefor N signals representative of any new input characters.

28. A printer comprising a character carrier with a plurality of different characters spaced apart thereon and arranged in a predetermined sequence, said characters being driven past a recording medium onto which characters are to be printed, said printer including selectively energizable means for causing a desired character to be printed on the recording medium at a desired column location, a circulating memory unit for receiving and serially circulating a plurality of input data character signals each having a value representing an individual character, means for providing a plurality of second signals each having a value identifying each of said carrier characters at each of said column locations, means for serially comparing the values of each of the data character signals circulating in the memory unit with each of said second signal values to provide respective output signals, means for generating a print command signal in response to a predetermined value of such output signal, wherein such predetermined value denotes agreement of the compared data character with the carrier character at the particular column location, and means responsive to said print command signal for causing said selectively energizable means to print each character on the recording medium at the desired column location.

29. A print selection system for a printer wherein the printer has a plurality of print characters arranged in a predetermined order and adapted to move during printing such that print characters move from column to column parallel to the print line, said print selection system comprising, memory means for storing a plurality of pairs of signals, a first signal in each pair representing a number identifying an input character the second signal in each pair indicating the column at which the input character related to said first signal is to be printed, means for providing an indication for each column change in the position of said print characters, means for examining a plurality of pairs of signals stored by said memory means with each change in the position of said print characters to provide indications of printable characters, and means responsive to said printable character indications and associated second signals to print out said printable characters in the columns corresponding to said last-named second signals.

30. A printer of received character data comprising a plurality of individual, different character printing elements which are carried in sequence to successive indexed positions along a line to be printed on a recording medium such that a plurality of the character printing elements are in alignment for printing at each of the successive indexed positions of the elements, memory means operable to sequentially receive and store identifying data for a plurality of characters of received data to be printed, said memory means being operable to assign and record signals representing sequential column positions for the printing of successive characters as said character data is received, detecting means for detecting the acheivement of each successive indexed position of said character printing elements, scanning means operable with said detecting means and the recorded signals for scanning said memory means for each indexed position of the character printing elements for recognizing all characters for which information is then stored in memory for which character printing elements are then positioned for printing, and individual character print energizing means for each character print position column connected to said scanning means for operation in response to said scanning means.

31. A control system as claimed in claim 30 wherein said scanning means includes a connection to said memory means for erasing the data stored therein relating to the recognized characters as they are recognized so that the erased portions of said memory are substantially immediately available for new data.

32. A control system as claimed in claim 30 wherein the capacity of said memory means for storing identifying data for characters to be printed is less than the full number of character positions at which characters can be printed in said line.

33. A system as claimed in claim 32 wherein said memory means comprises at least one serially operable recirculating memory, and said scanning means is operable to provide the scan-ning function by continuously monitoring the signals serially recirculating within said memory means.

34. A system as claimed in claim 33 wherein said memory means comprises two separate serially recirculating memories operable for recirculation of data stored therein in synchronism, one of said memories being operable to store said identifying data for characters to be printed, and the other one of said memories being operable to assign and record the sequential column positions for the printing of the characters.

35. A system as claimed in claim 30 wherein the characters for said character printing elements are identified by a linear sequence of integral number signals corresponding to the order in which the elements are carried in sequence along the line to be printed, said identifying data for said characters recorded in said memory means comprising said character identifying signals, said means for detecting the achievement of each successive indexed position of said character printing elements comprising a counter operable to change the integral count therein in correspondence with the character identifying signals of the one of the individual character printing elements at a predetermined fixed character printing position, the operation of said memory means in assigning and recording sequential column positions for the printing of each character being carried out to assign and record said positions in the form of a linear series of integral number signals which have the same relationship to one another as the number signals identifying successive character printing elements, and said means for scanning said memory means comprising an adder for combining said character printing element indexed position number signals and said assigned column position number signals to provide corresponding sum signals and including a comparator connected to compare the sum signals from said adder with said character identifying data number signals to provide indications of which character printing elements are positioned for printing in accordance with information stored in said memory means.

36. A system as claimed in claim 35 wherein said scanning means includes a decoder operable in response to the assigned column position number signal and in response to an indication from said comparator to emit a signal on a unique signal line for each separate selected column position, and means for storing said selected column position signals.

37. A system as claimed in claim 36 wherein said sequence of integral character identifying number signals represent a group of numbers within a fixed predetermined range of numbers, and said adder for combining said character printing element indexed position number signals and said assigned column position number signals including means for reconstituting the combined values thereof to place said combined values within said fixed predetermined range of numbers whenever said combined number signals result in a combination which is outside said predetermined range.

38. A system as recited in claim 37 wherein said character printing elements are spaced two column positions apart so that all character printing elements are position at odd numbered column positions and then at even numbered column positions in a repeating sequence for the successive indexed positions of said elements, said adder being operable to add the value of one half of the assigned column position number signal to the character printing element indexed position count number signal to provide sum signals with each sum signal indicating a number representing a print character moving into position to be printed in one of two columns, one of said columns being an odd numbered column, the other of said columns being an adjacent even numbered column, said assigned column position number signal being effective to indicate whether the odd numbered column or the even numbered column is the one at which a print character may be recognized for printing, means for detecting the odd-even sense of the position of said character printing elements, and inhibit means responsive to the odd-even sense of said assigned column position number and the odd-even sense of the position of said character printing elements to inhibit each comparator signal for which there is no identity of the odd-even sense.

39. A control system for a printer having a plurality of individually different character printing elements mounted upon a flexible type carrier, said carrier being movable along a print line having a plurality of alternately spaced odd and even print column positions, means for moving said belt to cause said elements to be carried in sequence to successive indexed positions along said print line such that a plurality of the character printing elements are in alignment for printing at each of the successive indexed positions of the elements, said elements having their centers uniformly spaced apart a distance equal to an integral multiple of twice the distance between the centers of adjacent print column positions, memory means operable to sequentially receive and store identifying data for a plurality of characters to be printed wherein the capacity of said memory means for storing identifying data for characters to be printed is less than the full number of column positions at which characters can be printed on said print line, said memory means being operable to assign and record sequential column position information for the printing of successive characters as said character data is received.

means for detecting the achievement of each successive indexed position of said character printing elements, means operable with said indexed position detecting means for scanning said memory means for each indexed position of the character printing elements for recognizing all characters for which information is then stored in memory for which character printing elements are then positioned for printing in odd or even print column positions, and means responsive to said scanning means for causing said character printing elements then positioned for printing to alternately print in said odd and even print column positions.

40. A print selection system for a printer wherein the printer has a plurality of print characters and means for effectively moving such print characters during printing such that they appear as a sequence of individually different print characters moving from column to column along a print line, said print selection system comprising:

memory means for storing pairs of numerical representations wherein a first representation in each pair represents an input character, and a second representation in each pair represents the column at which said input character is to be printed, said memory means adapted to store a number of numerical representations less than the number of columns in said print line, means for providing signals identifying each column change in moving print character position, means for comparing said stored first and second representations and said signals to detect print characters to be printed, and means responsive to the second representation in the pair of representations associated with such detected print characters to cause printout of the print character in the column indicated by said second representation.

41. A print selection system as recited in claim 40, wherein said means for providing signals comprises a register, means for storing in said register a numerical representation assigned to each print character passing a reference column position, said last-named representation being a fixed integral numerical increment different than the numerical representation for the preceding print character in said order.

42. A print selection system as recited in claim 41 further including input means responsive to input characters for providing the numerical representation for each input character, the numerical representation for each input character being the same as the numerical representation for a corresponding print character.

43. A print selection system as recited in claim 42 further including means for obtaining at least some of said first numerical representations in each pair of stored representations from said input means.

44. A print selection system as recited in claim 43 wherein the numerical representations of the characters comprising said print characters and input characters represent numerals of a predetermined code having a range of code values, and further including means for reconstituting the values of the numerical representations of said print selection system whenever the associated numerals exceed the range of said code values to equivalent numerical representations within said code.

45. A print selection system as recited in claim 44 further including erase means coupled to said memory means for erasing at least said first numerical representation of a pair in response to said numerical representation being detected to relate to a printable character.

46. A print selection system as recited in claim 45 further including print character memory means for storing indications of print characters to be printed for the duration of the comparing of the first numerical representations of said pairs for enabling simultaneous printout of selected print characters.

47. A print selection system as recited in claim 46 wherein said means for comparing comprises means for comparing said first numerical representation in each pair of representations with the numerical representation for the print character to be printed at the column indicated by said second numerical representation of the pair, coincidence of said compared numbers indicating the print character to be printed.

48. A print selection system as recited in claim 46 wherein said print characters are spaced to align alternately with even and odd numbered columns, and said means for comparing comprises an adder for combining the numerical representation stored in said register with one half of the second numerical representation in each pair to obtain a series of numerical sum representations, each numerical sum representation representing a print character moving into position to be printed in one of two columns, one column being an odd numbered column, the other column being an adjacent even numbered column, and one of the two columns being indicated by the second numerical representation in the corresponding pair of numerical representations, comparison means for comparing each numerical sum representation as it is obtained with said first numerical representation of the corresponding pair of numerical representations to detect coincidence of numerical representations, inhibit means responsive to the even-odd sense of the columns of an approaching print character alignment and the odd-even sense of the second numerical representation in the pair for the numerical sum representation being compared in said comparison means to inhibit each coincidence numerical representation for which there is no identity of the odd-even sense of the columns and said second numerical representation, and means to initiate printout of the corresponding print character in response to each uninhibited coincidence numerical representation.

49. A communication terminal comprising a keyboard, an external source, a receiver responsive to input information from said external source and from said keyboard, said input information comprising input characters to be printed, a transmission control controlling information flow from said keyboard to said receiver and to said external source, and a printer responsive to said receiver for printing said input characters on a recording medium, said printer having a plurality of individually different print characters arranged in a predetermined order and means for moving said print characters during printing such that print characters circulate from column to column along a line across the recording medium, said printer being controlled by a print selection system comprising, input means responsive to said input characters for providing pairs of numerical representations for each of the input characters comprising said input information, memory means for storing pairs of numerical representations, wherein a first representation in each pair represents an input character, and a second representation in each pair represents the column at which said input character is to be printed, means coupled to said memory means for obtaining some of said first representations in each pair of stored representations from said input means, means for providing signals indicating the position of said print characters, means for examining said first representation in each pair of representations stored by said memory means with each signal indicating a change in print character position to detect print characters to be printed, and means responsive to the second representations in the pair of representations associated with such detected print character to be printed to cause printout of said print character in the column indicated by said second representation.

50. A communication terminal as recited in claim 49 further comprising means for timing each signal indicating the position of said print characters to occur at a predetermined time before the print characters are in position for printing.

51. A communication terminal as recited in claim 50 wherein said means for providing signals indicating the position of said print characters is a register and means for storing in said register a numerical representation for each print character appearing adjacent a reference column, means for providing that each print character numerical representation is a fixed integral numerical increment greater than the numerical representation for the preceding print character in said order, said fixed integral numerical increment corresponding to the difference between two of said second numerical representations indicating adjacent columns.

52. A communication terminal for operation with an external circuit comprising:

a keyboard for providing input characters, a receiver responsive to input characters received from said external circuit and from said keyboard, a transmission control controlling input character flow from said keyboard to said receiver and to said external circuit, and a printer responsive to said receiver for printing said input characters on a recording medium, said printer having a plurality of individually different print characters arranged in a predetermined order with means for moving said print characters during printing such that print characters circulate along a print line, the printing of said printer being controlled by a print selection system including, a first memory responsive to input characters for storing indications of a sufficient number of said input characters to buffer the difference between a worst case speed involving printing of a single character at a time and the rate at which input characters are provided, a second memory responsive to each input character responded to by said first memory to store an indication of the order in which each character is received, a third memory responsive to print character position to store an indication of the print character at a reference position along said print line, an adder responsive to the indication stored by said third memory and successively to each of the indications stored by said second memory to form a series of sum indications, comparison means successively responsive to each sum indication from said adder and the indication from said first memory related to the indication from said second memory included in said sum indication to detect coincidence of the values of said compared indications and provide a signal indicating which print characters are to be printed, and printout means responsive to said signal to cause said last-named characters to be printed.

53. A print selection system for a printer which responds to input characters wherein the printer has a plurality of individually different print characters arranged in a predetermined order with means to move such print characters during printing such that the print characters circulate along a print line, said print selection system comprising:

memory means responsive to said input characters to store an indication identifying each input character and a respective indication identifying the order of receipt of each input character, said order indication also indicating the position on the print line for printing the associated input character, a register responsive to print character position to store an indication of the print character at a reference print position along said print line, the print character indication being the same as the input character identification of a corresponding input character, an adder responsive to the indication stored in said register and to each order indication stored by said memory means to form a series of sum indications, each sum indication being an indication of the print character at the print position corresponding to the order indication from said memory means in each sum indication, comparison means responsive to each sum indication from said adder and to the input character indication from said memory related to the order indication included in said sum indication to detect a given comparison of said sum indication and said last-named input character indication and provide an output signal, and printout means responsive to said output signal to cause print characters corresponding to the input character indications from memory included in said sum indications to be printed.

54. A print selection system as recited in claim 53 wherein said memory means comprises a first memory for storing an indication of the input characters and a second memory for storing an indication of the respective numerical order associated with said input characters.

55. A print selection system as recited in claim 53 wherein said memory means comprises a serial storage register storing an indication of each input character and an indication of the associated numerical serial order associated with such input character.

56. A print selection system as recited in claim 53 wherein said memory means comprises a serial storage register storing a digital indication of each input character interlaced with a digital indication of the associated order on a bit-by-bit basis, said adder being responsive to alternate bits of said memory means relating to the order indication associated with said input characters and said comparison means being responsive to alternate bits of information from said memory means relating to said indication of said input characters.

57. A print selection system for a printer wherein the printer has a plurality of different print characters arranged in a predetermined order with means for moving said print characters during printing such that print characters circulate along a print line, said print selection system comprising:

an input memory for receiving input characters and storing numerical representations of such input characters, a counter register responsive to receipt of each input character by said input memory for counting input characters and storing a numerical representation of each count, a print character register responsive to print character position for storing a numerical representation of the print character at a selected print position, combining means combining the count numerical representation associated with each input character with the print character numerical representation to obtain a series of numerical representations each representing the print character at a print position determined by the value of the corresponding count numerical representation, comparison means comparing each of said series of numerical representations with the corresponding input character numerical representation to detect given comparisons, and printout means responsive to said detected given comparisons to cause print characters corresponding to the numerical representations of said input characters to be printed.

58. A print selection system for a printer wherein the printer has characters arranged in a predetermined order with means for moving said print characters parallel to a print line, said print selection system comprising:

an input memory responsive to applied input characters to store a digital representation of each input character, a counter register responsive to receipt of each input character by said input memory for counting said input characters and storing a digital representation of each count, the stored count digital representation indicating the position on the print line for printing the associated input character, means for synchronously circulating the stored digital representations in said memory and counter register, a sensor generating a signal in response to the passage of each print character by said sensor, a print character register responsive to the sensor signal for registering a digital representation defining the print character adjacent the first print position, each print character arriving adjacent the first print position being accorded a digital representation one value higher different than the preceding print character, means responsive to said sensor for resetting said print character register to the digital representation of the first print character in said order of print characters when said first print character is adjacent the first print position, an adder responsive to the digital representation registered by said print character register and to each count digital representation stored by said counter register in succession to form a series of sum digital representations, each sum digital representation being the digital representation of the character at the print position corresponding to the value of the count representation in each sum representation, comparison means responsive to each sum represenation as it is formed and to the associated input character representation from said input memory to detect given comparisons of said sum representations and said associated input character representations, and printout means responsive to detected given comparisons to cause the print characters associated with said given comparisons to be printed.

59. A control system for a printer having a plurality of individually different printing characters disposed for appearance along a number of indexed positions in a line to be printed, means for causing said printing characters to appear successively along the sequence of indexed positions for possible use to record the characters on a record medium at selected index positions, print actuators situated at a number of said indexed positions, a character memory for storing identification characters for the characters to be printed, an address memory for storing for each identification character an associated address character for each indexed position in which the character is to be printed, said memories being arranged to accept and store the identification and address characters in the time sequence in which they appear, the number of locations available in each of the memories for storing identification and address characters being less than the number of indexed positions constituting a line, means for scanning the memory content of said memories during the transition time interval between the appearance of a given printing character at one indexed position of the line and the appearance of the same printing character at the next succeeding indexed position of the line, a print actuator controller coupled with the memories for indicating during character transition in which indexed positions characters are to be printed upon the completion of such transition, and a memory controller for replacing identification and address characters corresponding to characters selected for printing with new identification and address characters in the memories during the transition time interval.

60. An arrangement according to claim 59 comprising a sensor for providing signals representative of the progression of appearances of printing characters along said indexed positions, and an arithmetic and comparator unit responsive to identification characters from said character memory to address characters from said address memory and to said signals to control actuating of said print actuators.

61. An arrangement according to claim 59 comprising a source of first signals representative of the progression of appearances, of printing characters along said indexed positions, an adder for combining address characters from said address memory and said first signals for providing second signals, and a comparator responsive to said second signals and said identification characters from said character memory to control actuation of said print actuators.

62. An arrangement according to claim 59 comprising means for sensing the weight of identification characters in the time sequence in which they appear, and means for conditionally entering identification characters in response to the sensed weights thereof.

63. An arrangement according to claim 62 wherein said means for sensing the weight of identification characters has its input coupled with said character memory and provides an entry enabling signal when the sensed identification character weight is less than a predetermined value.

64. An arrangement according to claim 59 comprising a printing character progression sensor including a counter which provides indications of printing character progression through the sequence of indexed positions, means for controlling actuation of said print actuators in response to signals from said character memory, said address memory and said counter, means for controlling the entry of identification characters into said character memory comprising a character weight sensor and means to apply identification characters to the input of said character weight sensor, said character weight sensor having a predetermined numerical threshold of operation for enabling the entry of new identification characters into the character memory, and means for setting said counter to a number corresponding to said threshold value at the beginning of each new printing character progression cycle.

65. A printer control system according to claim 59 wherein said printing characters are carried on an endless continuously rotating loop and are spaced one from the other a distance corresponding to twice the distance separating adjacent indexed positions, and an odd-even indicator responsive to the progression of printing characters along the line of indexed positions and coupled with the control of the print actuators to select the group of such print actuators to be operated.

66. A control system for printer having a plurality of individually different print characters presented in sequence to successive indexed positions along a line to be printed on a recording medium such that a plurality of mutually adjacent print characters are simultaneously in alignment for printing at indexed positions along said line to be printed, said control system comprising:

a memory with a storage capacity less than the total number of indexed positions making up the print line, a counter and distributor cooperating with said memory to sequentially record into said memory a plurality of first signals representing incoming data characters to be printed, to assign indexed positions along the print line to each incoming data character and to record second signals in said memory representing said indexed positions, a sensor for detecting the successive appearance of print characters at each successive indexed position, a comparator connected in scanning relationship with said memory and with said sensor for delivering control signals in response to the presence and location of these print characters in position to be printed corresponding to first signals stored in said memory, print character activating means for each indexed character print position for causing print characters to print in response to said control signals, and means coupled to said comparator and said memory and responsive to said control signals for erasing first signals stored therein so that the erased portions of said memory are available for new first signals.

67. A system as claimed in claim 66 wherein said memory comprises two separate serially recirculating sections operable for recirculation of first and second signals stored therein in synchronism, one section of said memory being operable to store said first signals representing data characters to be printed, and the other section of said memory being operable to assign and record said second signals representing the sequential indexed positions for printing of such data characters, and said comparator continuously monitoring the serially recirculating signals within said memory to provide the scanning function.

68. A system as claimed in claim 66 wherein said second signals represent a linear sequence of integral numbers corresponding to the order in which incoming data characters are to appear in sequence along the line to be printed, said sensor comprising a counter operable too change the integral count therein in correspondence with the appearance of the print characters at successive indexed positions along the print line, said assigning and recording being in the form of signals representing a linear series of integral numbers which have the same relationship to one another as the count of said counter identifying successive print characters, and said comparator comprising an adder for combining said second signals and said count of said counter and for comparing the output from said adder with said first signals to thereby determine which print characters are positioned for printing in accordance with first signals stored in said memory.

69. A system as claimed in claim 68 wherein said comparator includes a decoder operable in response to said second signals and in response to a signal from said comparator for producing a control signal for each separate selected indexed position, and a selected column store for storing said selected indexed position signals.

70. A system as claimed in claim 68 wherein said characters are spaced two indexed positions apart so that all characters are positioned alternately at odd numbered indexed positions and at even numbered indexed positions in a repeating sequence for the successive indexed positions of said characters, said adder being operable to add the value of one-half of the assigned indexed position number to the character indexed position count number with each sum being a number representing a print character moving into position to be printed in one of two indexed positions, one of said indexed positions being an odd numbered indexed position, the other of said indexed positions being an adjacent even numbered indexed position, said assigned indexed position number being effective to indicate whether the odd numbered indexed position or the even numbered indexed position is the one at which a print character may be recognized for printing, a detector for detecting the odd-even sense of the position of said characters, and an inhibitor responsive to the odd-even sense of said assigned indexed position number and the odd-even sense of the position of said characters to inhibit each comparator signal for which there is no identity of the odd-even sense.

* * * * *

UNITED STATES PATENT OFFICE
CERTIFICATE OF CORRECTION

Patent No. 3,803,558 Dated April 9, 1974

Inventor(s) C.M. Jones, E.B. McDowell

It is certified that error appears in the above-identified patent and that said Letters Patent are hereby corrected as shown below:

| | |
|---|---|
| Column 3, line 5 | cancel "sektch" and insert -- sketch -- |
| Column 5, line 58 | cancel "column" and insert -- columns -- |
| line 67 | cancel "succeding" and insert -- succeeding -- |
| Column 8, line 33 | cancel "assocaited" and insert -- associated -- |
| line 37 | cancel "dealy" and insert -- delay -- |
| line 48 | cancel "recongize" and insert -- recognize -- |
| Column 17, line 2 | cancel "bu" and insert -- by -- |
| Claim 1, line 63 | cancel "whereby" and insert -- and -- |
| line 64 | cancel "may" and insert -- to -- |
| Claim 2, lines 7&8 | cancel "input characters" and insert -- each input character -- |
| Claim 19, line 62 | cancel "ans" and insert -- and -- |
| Claim 28, line 6 | after "character" insert -- to be printed at a desired column location, -- |
| Claim 29, line 32 | after "character" insert -- , -- |
| Claim 33, line 22 | cancel "scan-ning" and insert -- scanning -- |

UNITED STATES PATENT OFFICE
CERTIFICATE OF CORRECTION

Patent No. 3,803,558 Dated April 9, 1974

Inventor(s) C.M. Jones, E.B. McDowell

It is certified that error appears in the above-identified patent and that said Letters Patent are hereby corrected as shown below:

| | | |
|---|---|---|
| Claim 56, | line 21 | cancel "of" and insert -- from -- |
| | line 23 | after "characters" insert -- , -- |
| Claim 58, | lines 32&33 | cancel "represenation" and insert -- representation -- |
| Claim 61, | line 16 | after "appearances" cancel " , " |
| Claim 68, | line 49 | cancel "too" and insert -- to -- |

Signed and sealed this 1st day of October 1974.

(SEAL)
Attest:

McCOY M. GIBSON JR.
Attesting Officer

C. MARSHALL DANN
Commissioner of Patents